US008296662B2

(12) United States Patent
Amano

(10) Patent No.: US 8,296,662 B2
(45) Date of Patent: Oct. 23, 2012

(54) IMAGE DISPLAY DEVICE

(75) Inventor: Katsuhiro Amano, Toyota (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 465 days.

(21) Appl. No.: 12/555,471

(22) Filed: Sep. 8, 2009

(65) Prior Publication Data
US 2010/0064260 A1    Mar. 11, 2010

Related U.S. Application Data

(63) Continuation-in-part of application No. 12/525,773, filed as application No. PCT/JP2008/051502 on Jan. 31, 2008, now abandoned.

(30) Foreign Application Priority Data

Feb. 5, 2007  (JP) ................................. 2007-025050

(51) Int. Cl.
G06F 3/048 (2006.01)

(52) U.S. Cl. ........ 715/754; 715/716; 715/719; 715/721; 715/733; 715/747; 715/756; 715/765; 715/856; 715/859; 715/862

(58) Field of Classification Search .................. 715/754, 715/856, 859, 716, 719, 721, 733, 747, 756, 715/765, 862
See application file for complete search history.

(56) References Cited

U.S. PATENT DOCUMENTS

| | | | | |
|---|---|---|---|---|
| 5,119,076 A | * | 6/1992 | Wilson | 345/440.1 |
| 5,526,354 A | * | 6/1996 | Barraclough et al. | 370/260 |
| 5,689,305 A | * | 11/1997 | Ng et al. | 375/240.15 |
| 5,706,507 A | * | 1/1998 | Schloss | 709/225 |
| 5,717,869 A | * | 2/1998 | Moran et al. | 715/716 |
| 5,717,879 A | * | 2/1998 | Moran et al. | 715/716 |
| 5,729,288 A | | 3/1998 | Saito | |
| 5,815,217 A | * | 9/1998 | Kumazawa et al. | 348/700 |
| 6,035,336 A | * | 3/2000 | Lu et al. | 709/232 |
| 6,292,512 B1 | * | 9/2001 | Radha et al. | 375/240.1 |
| 6,326,983 B1 | * | 12/2001 | Venable et al. | 715/763 |
| 6,389,076 B2 | * | 5/2002 | Bakhmutsky et al. | 375/240.17 |

(Continued)

FOREIGN PATENT DOCUMENTS

EP    1143694 A2 * 10/2001

(Continued)

OTHER PUBLICATIONS

Ask-Search-q=%28amount+or+number%29+cursor+priority, Dec. 4, 2011.*

(Continued)

*Primary Examiner* — Boris Pesin
*Assistant Examiner* — John Heffington
(74) *Attorney, Agent, or Firm* — Banner & Witcoff, Ltd.

(57) ABSTRACT

The image display includes a bandwidth calculating means that calculates bandwidth of image data transmitted from a plurality of computer devices, based on at least any one piece of information about the position and movement of a cursor displayed in a display image and a transmission amount control means that controls data transmission amounts of the plurality of computer devices, based on the bandwidth of the image data. Incidentally, the bandwidth calculating means calculates a priority level from the number of cursors existing in a display frame of each of the computer devices, and determines the bandwidth based on the priority level.

19 Claims, 18 Drawing Sheets

U.S. PATENT DOCUMENTS

| | | | |
|---|---|---|---|
| 6,396,509 B1* | 5/2002 | Cheng | 715/706 |
| 6,473,088 B1 | 10/2002 | Matsumoto et al. | |
| 6,480,506 B1* | 11/2002 | Gubbi | 370/468 |
| 6,522,342 B1* | 2/2003 | Gagnon et al. | 715/716 |
| 6,532,263 B2* | 3/2003 | Radha et al. | 375/240.1 |
| 6,538,675 B2 | 3/2003 | Aratani et al. | |
| 6,573,890 B1 | 6/2003 | Lengyel | |
| 6,573,907 B1* | 6/2003 | Madrane | 715/719 |
| 6,606,095 B1 | 8/2003 | Lengyel | |
| 6,614,428 B1 | 9/2003 | Lengyel | |
| 6,614,439 B2 | 9/2003 | Matsumoto et al. | |
| 6,615,293 B1* | 9/2003 | Shima et al. | 710/30 |
| 6,658,618 B1* | 12/2003 | Gu et al. | 714/746 |
| 6,683,624 B1* | 1/2004 | Pazel et al. | 715/763 |
| 6,714,172 B2 | 3/2004 | Matsuzaki et al. | |
| 6,724,403 B1* | 4/2004 | Santoro et al. | 715/765 |
| 6,751,356 B2* | 6/2004 | Oki | 382/240 |
| 6,760,042 B2* | 7/2004 | Zetts | 715/716 |
| 6,775,659 B2* | 8/2004 | Clifton-Bligh | 1/1 |
| 6,801,665 B1* | 10/2004 | Atsumi et al. | 382/239 |
| 6,850,252 B1* | 2/2005 | Hoffberg | 715/716 |
| 6,888,818 B1* | 5/2005 | Gubbi | 370/349 |
| 6,895,438 B1* | 5/2005 | Ulrich | 709/227 |
| 6,910,221 B1* | 6/2005 | Honda | 725/93 |
| 6,973,649 B1* | 12/2005 | Pazel | 718/100 |
| 7,027,506 B2* | 4/2006 | Lee et al. | 375/240.03 |
| 7,028,264 B2* | 4/2006 | Santoro et al. | 715/765 |
| 7,068,834 B1* | 6/2006 | Ikeda et al. | 382/145 |
| 7,093,015 B2* | 8/2006 | Gubbi et al. | 709/225 |
| 7,161,557 B2* | 1/2007 | Thornton | 345/2.1 |
| 7,174,091 B2* | 2/2007 | Umeda | 386/353 |
| 7,178,161 B1* | 2/2007 | Fristoe et al. | 725/86 |
| 7,221,804 B2* | 5/2007 | Atsumi et al. | 382/239 |
| 7,251,231 B2* | 7/2007 | Gubbi | 370/336 |
| 7,299,409 B2* | 11/2007 | Joshi et al. | 715/234 |
| 7,321,619 B2* | 1/2008 | Samueli et al. | 375/229 |
| 7,376,907 B2* | 5/2008 | Santoro et al. | 715/765 |
| 7,392,532 B2* | 6/2008 | White et al. | 725/135 |
| 7,433,881 B1* | 10/2008 | Hill | 1/1 |
| 7,474,741 B2* | 1/2009 | Brunson et al. | 379/88.17 |
| 7,496,736 B2* | 2/2009 | Haghighi | 712/221 |
| 7,523,393 B2* | 4/2009 | Joshi et al. | 715/234 |
| 7,562,311 B2* | 7/2009 | Schiller | 715/838 |
| 7,626,994 B2* | 12/2009 | Bennett | 370/419 |
| 7,653,252 B2* | 1/2010 | Hernandez et al. | 382/232 |
| 7,665,094 B2* | 2/2010 | Frender et al. | 719/310 |
| 7,671,873 B1* | 3/2010 | Pierini et al. | 345/603 |
| 7,697,771 B2* | 4/2010 | Atsumi et al. | 382/239 |
| 7,725,826 B2* | 5/2010 | Kreifeldt et al. | 715/716 |
| 7,757,186 B2* | 7/2010 | Fabrick, II | 715/862 |
| 7,782,295 B2* | 8/2010 | Nagayasu | 345/156 |
| 7,801,992 B2* | 9/2010 | Gibbons et al. | 709/226 |
| 7,814,524 B2* | 10/2010 | Candelore | 725/113 |
| 7,865,832 B2* | 1/2011 | Shima et al. | 715/721 |
| 7,889,181 B2* | 2/2011 | Bi et al. | 345/169 |
| 7,908,555 B2* | 3/2011 | Zellner | 715/718 |
| 7,925,978 B1* | 4/2011 | McGavran et al. | 715/723 |
| 7,987,431 B2* | 7/2011 | Santoro et al. | 715/765 |
| 8,001,471 B2* | 8/2011 | Shaver et al. | 715/716 |
| RE42,728 E* | 9/2011 | Madrane | 715/716 |
| 8,015,331 B2* | 9/2011 | Sampath et al. | 710/62 |
| 8,015,491 B2* | 9/2011 | Shaver et al. | 715/719 |
| 8,024,657 B2* | 9/2011 | Larsen et al. | 715/723 |
| 8,036,496 B2* | 10/2011 | Kim | 382/302 |
| 2001/0016077 A1* | 8/2001 | Oki | 382/240 |
| 2001/0017977 A1* | 8/2001 | Umeda | 386/111 |
| 2001/0022816 A1* | 9/2001 | Bakhmutsky et al. | 375/240.17 |
| 2001/0024470 A1* | 9/2001 | Radha et al. | 375/240.1 |
| 2001/0024529 A1* | 9/2001 | Chao et al. | 382/240 |
| 2001/0045965 A1* | 11/2001 | Orbanes et al. | 345/841 |
| 2001/0052110 A1* | 12/2001 | Orbanes et al. | 717/1 |
| 2002/0006229 A1* | 1/2002 | Chao et al. | 382/240 |
| 2002/0028023 A1* | 3/2002 | Kazayama et al. | 382/243 |
| 2002/0089541 A1* | 7/2002 | Orbanes et al. | 345/764 |
| 2002/0140719 A1* | 10/2002 | Amir et al. | 345/716 |
| 2003/0002529 A1* | 1/2003 | Gibbons et al. | 370/468 |
| 2003/0002579 A1* | 1/2003 | Radha et al. | 375/240.1 |
| 2003/0020671 A1* | 1/2003 | Santoro et al. | 345/1.3 |
| 2003/0023671 A1* | 1/2003 | Abdulrahiman et al. | 709/203 |
| 2003/0120802 A1* | 6/2003 | Kohno | 709/237 |
| 2003/0182402 A1* | 9/2003 | Goodman et al. | 709/220 |
| 2003/0189587 A1* | 10/2003 | White et al. | 345/716 |
| 2003/0210821 A1* | 11/2003 | Yogeshwar et al. | 382/232 |
| 2003/0217360 A1* | 11/2003 | Gordon et al. | 725/54 |
| 2003/0219030 A1* | 11/2003 | Gubbi | 370/442 |
| 2003/0231621 A1* | 12/2003 | Gubbi et al. | 370/352 |
| 2004/0015765 A1* | 1/2004 | Cooper et al. | 714/750 |
| 2004/0070675 A1* | 4/2004 | Fredlund et al. | 348/208.1 |
| 2004/0085361 A1* | 5/2004 | Kessler et al. | 345/776 |
| 2004/0125123 A1* | 7/2004 | Vasudevan | 345/716 |
| 2004/0141556 A1* | 7/2004 | Rault et al. | 375/240.16 |
| 2004/0201628 A1* | 10/2004 | Johanson et al. | 345/764 |
| 2005/0001035 A1* | 1/2005 | Hawley et al. | 235/462.21 |
| 2005/0025371 A1* | 2/2005 | Atsumi et al. | 382/239 |
| 2005/0033876 A1* | 2/2005 | Hanes et al. | 710/29 |
| 2005/0034068 A1* | 2/2005 | Jaeger | 715/517 |
| 2005/0056699 A1* | 3/2005 | Meier et al. | 235/454 |
| 2005/0078190 A1* | 4/2005 | Bloom et al. | 348/207.99 |
| 2005/0128530 A1 | 6/2005 | Aiba et al. | |
| 2005/0172232 A1* | 8/2005 | Wiseman | 715/718 |
| 2005/0226332 A1* | 10/2005 | Uetani | 375/240.16 |
| 2005/0229010 A1* | 10/2005 | Monk et al. | 713/186 |
| 2005/0262241 A1* | 11/2005 | Gubbi et al. | 709/225 |
| 2005/0265444 A1* | 12/2005 | Kim | 375/240.1 |
| 2005/0283734 A1* | 12/2005 | Santoro et al. | 715/765 |
| 2006/0048051 A1* | 3/2006 | Lazaridis | 715/517 |
| 2006/0071947 A1* | 4/2006 | Ubillos et al. | 345/648 |
| 2006/0098735 A1* | 5/2006 | Chang | 375/240.12 |
| 2006/0126739 A1* | 6/2006 | Stoner | 375/240.16 |
| 2006/0210184 A1* | 9/2006 | Song et al. | 382/239 |
| 2006/0253763 A1* | 11/2006 | Oliva et al. | 714/746 |
| 2007/0008325 A1* | 1/2007 | Rai et al. | 345/501 |
| 2007/0031045 A1* | 2/2007 | Rai et al. | 382/232 |
| 2007/0064797 A1* | 3/2007 | Miao et al. | 375/240.12 |
| 2007/0065032 A1* | 3/2007 | Hernandez et al. | 382/239 |
| 2007/0110080 A1* | 5/2007 | Bennett | 370/400 |
| 2007/0118395 A1* | 5/2007 | Haase | 705/1 |
| 2007/0129841 A1* | 6/2007 | Colico et al. | 700/166 |
| 2007/0146507 A1* | 6/2007 | Jeong | 348/241 |
| 2007/0171238 A1* | 7/2007 | Ubillos et al. | 345/648 |
| 2007/0183493 A1* | 8/2007 | Kimpe | 375/240.1 |
| 2007/0186189 A1* | 8/2007 | Schiller | 715/838 |
| 2007/0229516 A1* | 10/2007 | Sugimoto | 345/473 |
| 2007/0237409 A1* | 10/2007 | Atsumi et al. | 382/239 |
| 2007/0247544 A1* | 10/2007 | Imamura | 348/366 |
| 2007/0253480 A1* | 11/2007 | Tsujii et al. | 375/240.08 |
| 2007/0260985 A1* | 11/2007 | Utagawa et al. | 715/721 |
| 2007/0273666 A1* | 11/2007 | Shin et al. | 345/173 |
| 2007/0277123 A1* | 11/2007 | Shin et al. | 715/863 |
| 2007/0296872 A1* | 12/2007 | Yamasaki et al. | 348/716 |
| 2008/0001796 A1* | 1/2008 | Oshikiri et al. | 341/107 |
| 2008/0016491 A1* | 1/2008 | Doepke | 717/104 |
| 2008/0055336 A1* | 3/2008 | Matsushita | 345/619 |
| 2008/0058639 A1* | 3/2008 | Sakaida et al. | 600/425 |
| 2008/0063293 A1* | 3/2008 | Jones | 382/251 |
| 2008/0069203 A1* | 3/2008 | Karczewicz et al. | 375/240.01 |
| 2008/0092045 A1* | 4/2008 | Candelore | 715/716 |
| 2008/0098081 A1* | 4/2008 | Noda et al. | 709/208 |
| 2008/0117976 A1* | 5/2008 | Lu et al. | 375/240.16 |
| 2008/0120291 A1* | 5/2008 | Delgo et al. | 707/5 |
| 2008/0120328 A1* | 5/2008 | Delgo et al. | 707/102 |
| 2008/0144140 A1* | 6/2008 | Eldridge et al. | 358/515 |
| 2008/0159408 A1* | 7/2008 | Degtyarenko | 375/240.25 |
| 2008/0163056 A1* | 7/2008 | Lamadon | 715/716 |
| 2008/0164314 A1* | 7/2008 | Meier et al. | 235/462.1 |
| 2008/0174677 A1* | 7/2008 | Nakajima et al. | 348/231.6 |
| 2008/0198396 A1* | 8/2008 | Nakami et al. | 358/1.9 |
| 2008/0235390 A1* | 9/2008 | Noda et al. | 709/232 |
| 2008/0279285 A1* | 11/2008 | Kleihorst | 375/240.26 |
| 2009/0073005 A1* | 3/2009 | Normile et al. | 341/51 |
| 2009/0074052 A1* | 3/2009 | Fukuhara et al. | 375/240.01 |
| 2009/0132942 A1* | 5/2009 | Santoro et al. | 715/765 |
| 2009/0187858 A1* | 7/2009 | Ubillos et al. | 715/825 |
| 2009/0196353 A1* | 8/2009 | Weatherspoon | 375/240.16 |
| 2009/0232201 A1* | 9/2009 | Weatherspoon | 375/240.01 |
| 2009/0238405 A1* | 9/2009 | Buznach | 382/103 |
| 2009/0291731 A1* | 11/2009 | Jaffe et al. | 463/16 |

| | | | | |
|---|---|---|---|---|
| 2010/0014534 A1* | 1/2010 | Bennett ............... 370/401 |
| 2010/0017047 A1* | 1/2010 | Sanders-Reed ............ 701/3 |
| 2010/0034523 A1* | 2/2010 | Kim et al. ............ 386/124 |
| 2010/0050080 A1* | 2/2010 | Libert et al. ............ 715/716 |
| 2010/0122127 A1* | 5/2010 | Oliva et al. ............ 714/704 |
| 2010/0140356 A1* | 6/2010 | Hawley et al. ............ 235/462.2 |
| 2010/0146447 A1* | 6/2010 | Ubillos et al. ............ 715/828 |
| 2010/0149554 A1* | 6/2010 | De Graaff et al. ............ 358/1.2 |
| 2010/0192095 A1* | 7/2010 | Ubillos et al. ............ 715/810 |
| 2010/0332379 A1* | 12/2010 | Ram et al. ............ 705/37 |
| 2011/0167110 A1* | 7/2011 | Hoffberg et al. ............ 709/203 |
| 2011/0187563 A1* | 8/2011 | Sanders-Reed ............ 340/971 |

FOREIGN PATENT DOCUMENTS

| JP | 08-051571 A | | 2/1996 |
|---|---|---|---|
| JP | 08-223530 A | | 8/1996 |
| JP | 09-034432 A | | 2/1997 |
| JP | 11-110092 A | | 4/1999 |
| JP | 11-212521 A | | 8/1999 |
| JP | 11-305917 A | | 11/1999 |
| JP | 2000-222164 A | | 8/2000 |
| JP | 2001157209 A | * | 6/2001 |
| JP | 2002-517851 T | | 6/2002 |
| JP | 2002-223264 A | | 8/2002 |
| JP | 2003-037823 A | | 2/2003 |
| JP | 2003-323168 A | | 11/2003 |
| JP | 2004-234452 A | | 8/2004 |
| JP | 2005-091751 A | | 4/2005 |
| JP | 2005-181404 A | | 7/2005 |
| JP | 2007-166537 A | | 6/2007 |
| JP | 2008-005382 A | | 1/2008 |

OTHER PUBLICATIONS

Ask-Search-q=number+cursors+bandwidth&qsrc=0&o=0&l=, Dec. 4, 2011.*
Ask-Search-qsrc=1&o=0&l=dir&q=%28count+or+number+% 29, Dec. 4, 2011.*
Ask-Search-qsrc=1 &o=0&l=dir&q=count+cursors+bandwid, Dec. 4, 2011.*
Ask-Search-q=%28amount+or+number%29+cursor+priority.*
Ask-Search-q=bandwidth+of+an+image&gsrc=19&o=0&l=di.*
Ask-Search-q=hover+determine+bandwidth&qsrc=0&o=0&l.*
Ask-Search-q=number+cursors+bandwidth&qsrc=0&o=0&l=.*
Ask-Search-qsrc=1&o=0&i=dir&q=%28count+or+number%29.*
Ask-Search-qsrc=1&o=0&l=dir&q=count+cursors+bandwid.*
Ask-Search-qsrc=1&o=0&l=dir&q=select+image+calculat.*
Ask-Search-qsrc=1 &o=0&l=dir&q=select+image+determin.*
Ask-Search-qsrc=1 &o=0&l=dir&q=hover+calculate+bandw.*
International Search Report Mar. 11, 2008, PCT/JP2008/051502.

* cited by examiner

IMAGE DISPLAY DEVICE

CROSS REFERENCE TO RELATED APPLICATION

The present application is a Continuation-in-Part (CIP) of prior U.S. application Ser. No. 12/525,773, filed Aug. 4, 2009, which is a U.S. national phase application under 35 U.S.C. §371 of prior International Application No. PCT/JP2008/051502, filed Jan. 31, 2008, which was published under PCT Article 21(2), which claims from Japanese Patent Application No. 2007-025050, which was filed on Feb. 5, 2007, the disclosure of which is incorporated herein by reference in its entirety.

TECHNICAL FIELD

The present invention relates to an image display device that displays image data within one region even if the image data is transmitted from more than one computer.

BACKGROUND OF THE INVENTION

These days participants of a meeting or the like often prepare documents on their computers (notebook computers, for example), and display the documents on a large-size image display device (a projector, for example) at the meeting or the like.

When the participants display their documents on a single screen at the same time, the meeting progresses smoothly, because each participant can look not only at their own documents but also at the documents prepared by the other participants while the meeting is in progress.

Following image display system is suggested. This image display system displays images supplied from different image sources on a single screen, while changing the display region with a joystick.

In such an image display system, however, the transmission band is compressed, and the frame rate does not become higher, if more than one computer is connected to the image display system over a network, by which the documents may not be seen well to cause a meeting being not smooth. Also, when a mouse is used for operations, the movement of the displayed cursor is not smooth, as the transmission band is compressed. As a result, the progress of the meeting is slowed down.

DISCLOSURE OF THE INVENTION

Problems to be Solved by the Invention

An object of the present invention is to provide an image display device that can solve the above problems, has an easy-to-see single screen even when documents are displayed thereon, and allows smooth cursor movements even when a mouse is used for operations.

Means for Solving the Problems

To solve the problems, the invention claimed in claim 1 relates to an image display device that displays images displayed by a plurality of computer devices in one region. The image display device is characterized by comprising: a receiving unit that receives the plurality of image data and cursor position information data transmitted from the plurality of computer devices; an image arranging means that places images generated from the plurality of image data within the one region in a non-overlapping manner or a synthetically overlapping manner; a cursor arranging means that sets the position of a cursor in the one region, based on the cursor position information data, and generates and places a cursor image in the one region; a bandwidth calculating means that calculates the bandwidth of the image data transmitted from the plurality of computer devices, based on at least one piece of information about the position of the cursor displayed in the one region and movement of the cursor displayed in the one region; and a transmission amount control means that controls the data transmission amounts of the plurality of computer devices, based on the image data bandwidth.

The image arranging means of the invention claimed in claim 2 generates display frames to be displayed on the respective computer devices, in accordance with the image data transmitted from the plurality of computer devices, and arranges the display frames in the one region in a non-overlapping manner.

The bandwidth calculating means of the invention claimed in claim 3 performs an operation to increase the bandwidth of the image data of the computer device transmitting the cursor position information data of the last moved cursor.

The bandwidth calculating means of the invention claimed in claim 4 performs an operation to increase the bandwidth of the image data of the computer device transmitting the image data of the display frame having the last moved cursor located therein.

The bandwidth calculating means of the invention claimed in claim 5 performs an operation to increase the bandwidth of the image data of the computer device transmitting the image data of the display frame having the cursor located therein.

The bandwidth calculating means of the invention claimed in claim 6 calculates a priority level from the number of cursors existing in the display frame of each of the computer devices, and determines each bandwidth based on each corresponding priority level.

The bandwidth calculating means of the invention claimed in claim 7 calculates the priority level of each of the computer devices by adding a predetermined numeric value to the number of cursors existing in the display frame of each corresponding computer device. The bandwidth calculating means then calculates the image data bandwidth of each of the computer devices by dividing the maximum bandwidth used for image data transmission by a numeric value obtained by adding up all the priority levels, and multiplying the resultant value by the numeric value of each corresponding priority level.

The image arranging means of the invention claimed in claim 8 generates display frames to be displayed on the computer devices, in accordance with the image data transmitted from the plurality of computer devices, and arrange the display frames in one image region in a synthetically overlapping manner.

The bandwidth calculating means of the invention claimed in claim 9 performs an operation to increase the bandwidth of the image data of the computer device transmitting the cursor position information data of the last moved cursor.

The bandwidth calculating means of the invention claimed in claim 10 performs an operation to increase the bandwidth of the image data of the computer device transmitting the image data of the window region having the last moved cursor located therein.

The bandwidth calculating means of the invention claimed in claim 11 performs an operation to increase the bandwidth of the image data of the computer device transmitting the image data of the window region having the cursor located therein.

The bandwidth calculating means of the invention claimed in claim 12 calculates a priority level from the number of cursors existing in the window region of each of the computer devices, and determines the bandwidth based on the priority level.

The bandwidth calculating means of the invention claimed in claim 13 calculates the priority level of each of the computer devices by adding a predetermined numeric value to the number of cursors existing in the window region displayed on each corresponding computer device. The bandwidth calculating means then calculates the image data bandwidth of each of the computer devices by dividing the maximum bandwidth used for image data transmission by a numeric value obtained by adding up all the priority levels, and multiplying the resultant value by the numeric value of each corresponding priority level.

The bandwidth calculating means of the invention claimed in claim 14 always maintains the bandwidth of the cursor position information data transmitted from the plurality of computer devices at a predetermined bandwidth or greater, and subtracts the bandwidth from the maximum transmission bandwidth to determine the maximum image data bandwidth.

The transmission amount control means of the invention claimed in claim 15 transmits the bandwidth of the cursor position information data maintained by the bandwidth calculating means to the plurality of computer devices, to control the transmission amounts of the cursor position information data of the plurality of computer devices.

The transmission amount control means of the invention claimed in claim 16 transmits the bandwidth of the image data calculated by the bandwidth calculating means to the plurality of computer devices, to control the transmission amounts of the image data of the plurality of computer devices.

Where the image data is transmitted by a communication process involving a flow control operation, the transmission amount control means of the invention claimed in claim 17 transmits a reception confirmation signal or a next transmission request signal to the computer devices, when a per-unit-time reception data amount received by the receiving unit is not larger than the bandwidth of the image data. The transmission amount control means does not transmit the reception confirmation signal and the next transmission request signal to the computer devices, when the per-unit-time reception data amount received by the receiving unit is larger than the bandwidth of the image data. In this manner, the transmission amount control means controls the image data transmission amounts of the plurality of computer devices.

Where the image data is transmitted by using TCP, as an example of the transmission amount control means of the invention claimed in claim 17, the transmission amount control means transmits ACK to the computer devices, when the per-unit-time reception data amount received by the receiving unit is not larger than the image data bandwidth. The transmission amount control means does not transmit the ACK to the computer devices, when the per-unit-time reception data amount received by the receiving unit is larger than the image data bandwidth. In this manner, the transmission amount control means controls the image data transmission amount of the plurality of computer devices.

The transmission amount control means of the invention claimed in claim 18 or 19 transmits a display frame update permitting signal to the plurality of computer devices in accordance with priority levels, the display frame update permitting signal being a signal for allowing only one frame of the display frames displayed on the plurality of computers devices to the image display device.

Effects of the Invention

According to the invention claimed in claim 1, an image display device calculates the bandwidth of the image data transmitted from the plurality of computer devices, based on at least one piece of information about the position of the cursor and the movement of the cursor existing in one region. In accordance with the image data bandwidth, the image display device controls the data transmission amounts of the plurality of computer devices. Accordingly, it becomes possible to increase the image data bandwidth of only the computer device that is being operated or drawing attention. As the screen of the subject computer device is often updated, it becomes possible to provide an image display device that displays documents easy to see on a single screen.

Further, according to the invention claimed in claim 2, the image arranging means generates display frames to be displayed on the computer devices, in accordance with the image data transmitted from the plurality of computer devices, and arranges the display frames in one region in a non-overlapping manner. With this arrangement, it is possible not only to look at documents one has prepared, but also to compare the documents with documents prepared by the other participants.

Further, according to the invention claimed in claim 3, the bandwidth calculating means performs an operation to increase the bandwidth of the image data of the computer device transmitting the cursor position information data of the last moved cursor. In this manner, the bandwidth of the image data of the computer device being operated is increased, so that the display frame displayed on the computer device can be made easier to see.

Further, according to the invention claimed in claim 4, the bandwidth calculating means performs an operation to increase the bandwidth of the image data of the computer device transmitting the image data of the display frame having the last moved cursor located therein. In this manner, the bandwidth of the image data of the computer device transmitting the image data of the display frame that has the last moved cursor located therein and is drawing attention is increased, so that the display frame displayed on the computer device can be made easier to see.

Further, according to the invention claimed in claim 5, the bandwidth calculating means performs an operation to increase the bandwidth of the image data of the computer device transmitting the image data of the display frame having the cursor located therein. In this manner, the bandwidth of the image data of the computer device transmitting the image data of the display frame that has the cursor located therein and is drawing attention is increased, so that the display frame displayed on the computer device can be made easier to see.

Further, according to the invention claimed in claim 6, the bandwidth calculating means calculates a priority level from the number of cursors existing in the display frame of each of the computer devices, and determines each bandwidth based on each corresponding priority level. In this manner, the bandwidth of the image data of the computer device transmitting the image data of the display frame that has the cursor located therein and is drawing attention is increased, so that the display frame displayed on the computer device can be made easier to see.

Further, according to the invention claimed in claim 7, the bandwidth calculating means calculates the priority level of each of the computer devices by adding a predetermined numeric value to the number of cursors existing in the display frame of each corresponding computer device. The bandwidth calculating means then calculates the image data bandwidth of each of the computer devices by dividing the maximum bandwidth used for image data transmission by a numeric value obtained by adding up all the priority levels, and multiplying the resultant value by the numeric value of each corresponding priority level. In this manner, the bandwidth of the image data of the computer device transmitting the image data of the display frame that has the cursor located therein and is drawing attention is increased, so that the display frame displayed on the computer device can be made easier to see.

Further, according to the invention claimed in claim 8, the image arranging means generates display frames to be displayed on the plurality of computer devices, in accordance with the image data transmitted from the plurality of computer devices, and arranges the display frames in one image region in a synthetically overlapping manner. With this arrangement, it is possible not only to look at documents one has prepared, but also to compare the documents with documents prepared by the other participants. Also, the window regions displayed on the respective computer devices can be placed in a large area of one region, and each of the window regions can be made easier to see.

Further, according to the invention claimed in claim 9, the bandwidth calculating means performs an operation to increase the bandwidth of the image data of the computer device transmitting the cursor position information data of the last moved cursor. In this manner, the bandwidth of the image data of the computer device being operated is increased, so that the display frame displayed on the computer device can be made easier to see.

Further, according to the invention claimed in claim 10, the bandwidth calculating means performs an operation to increase the bandwidth of the image data of the computer device transmitting the image data of the window region having the last moved cursor located therein. In this manner, the bandwidth of the image data of the computer device transmitting the image data of the window region that has the last moved cursor located therein and is drawing attention is increased, so that the window region displayed on the computer device can be made easier to see.

Further, according to the invention claimed in claim 11, the bandwidth calculating means performs an operation to increase the bandwidth of the image data of the computer device transmitting the image data of the window region having the cursor located therein. In this manner, the bandwidth of the image data of the computer device transmitting the image data of the window region that has the cursor located therein and is drawing attention is increased, so that the display frame displayed on the computer device can be made easier to see.

Further, according to the invention claimed in claim 12, the bandwidth calculating means calculates a priority level from the number of cursors existing in the window region of each of the computer devices, and determines the bandwidth based on the priority level. In this manner, the bandwidth of the image data of the computer device transmitting the image data of the window region that has the cursor located therein and is drawing attention is increased, so that the display frame displayed on the computer device can be made easier to see.

Further, according to the invention claimed in claim 13, the bandwidth calculating means calculates the priority level of each of the computer devices by adding a predetermined numeric value to the number of cursors existing in the window region displayed on each corresponding computer device. The bandwidth calculating means then calculates the image data bandwidth of each of the computer devices by dividing the maximum bandwidth used for image data transmission by a numeric value obtained by adding up all the priority levels, and multiplying the resultant value by the numeric value of each corresponding priority level. In this manner, the bandwidth of the image data of the computer device transmitting the image data of the window region that has the cursor located therein and is drawing attention is increased, so that the display frame displayed on the computer device can be made easier to see.

Further, according to the invention claimed in claim 14, the bandwidth calculating means always maintains the bandwidth of the cursor position information data transmitted from the plurality of computer devices at a predetermined bandwidth or greater, and subtracts the bandwidth from the maximum transmission bandwidth to determine the maximum image data bandwidth. Since the cursor position information data is not affected by the number of computer devices connected to the image display device or by the amount of image data transmitted from the computer devices, the movement of each cursor displayed on the display image can be made smoother.

Further, according to the invention claimed in claim 15, the transmission amount control means transmits the bandwidth of the cursor position information data maintained by the bandwidth calculating means to the plurality of computer devices. In this manner, it is possible to control the transmission amounts of the cursor position information data of the plurality of computer devices.

Further, according to the invention claimed in claim 16, the transmission amount control means transmits the bandwidth of the image data calculated by the bandwidth calculating means to the computer devices. In this manner, it is possible to control the transmission amounts of the image data of the computer devices.

According to the invention claimed in claim 17, where the image data is transmitted by a communication process involving a flow control operation, the transmission amount control means transmits a reception confirmation signal or a next transmission request signal to the computer devices, if the per-unit-time reception data amount received by the receiving unit is not larger than the bandwidth of the image data. The transmission amount control means does not transmit the reception confirmation signal and the next transmission request signal to the computer devices, if the per-unit-time reception data amount received by the receiving unit is larger than the bandwidth of the image data. In this manner, it is possible to control the image data transmission amounts of the plurality of computer devices.

According to the invention claimed in claim 18 or 19, the transmission amount control means transmits a display frame update permitting signal to the plurality of computer devices in accordance with priority levels, the display frame update permitting signal being a signal for allowing only one frame of the display frames displayed on the plurality of computer devices to the image display device. In this manner, the updating of the display frames of the computer devices having lower priority levels is slower, while the updating of the display frames of the computer devices having higher priority levels is made quicker. Accordingly, the display frame displayed on the subject computer device can be made easier to see.

DESCRIPTION OF THE DRAWINGS

Some features herein are illustrated by way of example, and not by way of limitation, in the figures of the accompanying drawings and in which like reference numerals refer to similar elements.

Figure 1:
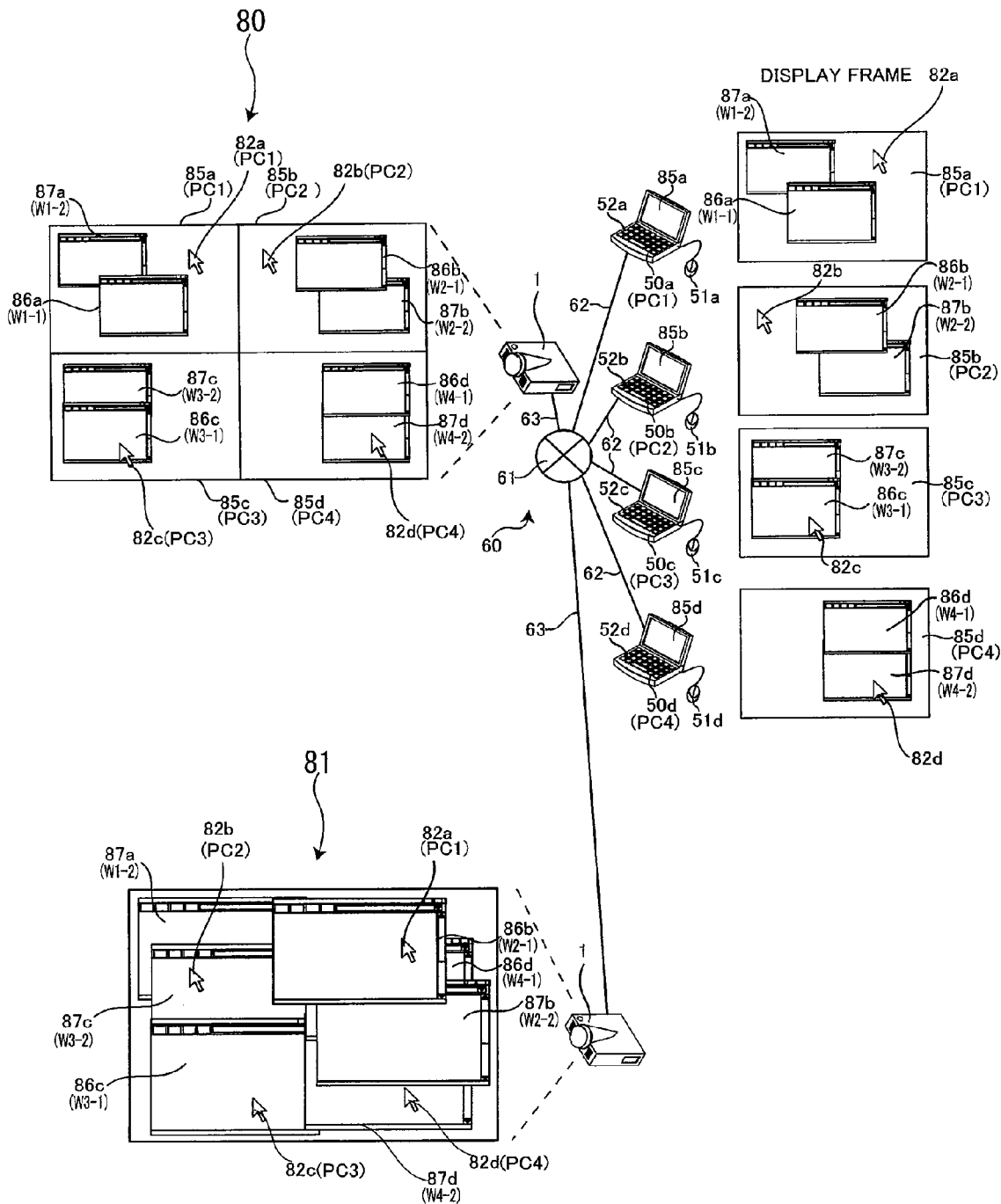
FIG. 1 illustrates an example image display system including an image display device according to one or more aspects described herein.

EXPLANATION OF REFERENCE NUMERALS 1 image display device
10 network connecting unit
10a receiving unit
10b transmitting unit
21 lamp drive circuit
22 light source
23 illumination optics
24 LCD
25 imaging optics
26 focus adjustment mechanism
27 image signal input unit
28 image processing circuit
29 bus
30 LCD drive circuit
31 cursor arranging means
32 image arranging means
33 microcomputer
34 memory device
34a parameter storage area
34b control software storage area
35 nonvolatile memory
36 control panel
38 infrared receiving unit
37 infrared control unit
39 bandwidth calculating means
40 transmission amount control means
50a computer device (PC1)
50b computer device (PC2)
50c computer device (PC3)
50d computer device (PC4)
51a mouse (computer device 50a)
51b mouse (computer device 50b)
51c mouse (computer device 50c)
51d mouse (computer device 50d)
52 keyboard
53a display (computer device 50a)
53d display (computer device 50d)
60 communication means
61 hub
62 communication line
63 communication line
65 intranet
66 Internet
67 hub
68 switch
69 router
70 server
71 firewall
72 wireless LAN access point
75 screen
80 display image
81 display image
82a cursor (computer device 50a)
82b cursor (computer device 50b)
82c cursor (computer device 50c)
82d cursor (computer device 50d)
85a display frame (computer device 50a)
85b display frame (computer device 50b)
85c display frame (computer device 50c)
85d display frame (computer device 50d)
86a window region (computer device 50a)
86b window region (computer device 50b)
86c window region (computer device 50c)
86d window region (computer device 50d)
87a window region (computer device 50a)
87b window region (computer device 50b)
87c window region (computer device 50c)
88d window region (computer device 50d)
100 image display system

BEST MODE FOR CARRYING OUT THE INVENTION

The following is a description of preferred embodiments of the present invention, with reference to the accompanying drawings.

FIG. 1 illustrates the structure of an image display system that includes an image display device of the present invention. As shown in FIG. 1, an image display system 100 includes computer devices 50a through 50d (denoted by PC1 through PC4 in the drawing) that transmit image data, an image display device 1 that displays the "image data" transmitted from the computer devices 50a through 50b as a display image 80 or a display image 81, and a communication means 60 that connects a plurality of computer devices 50a through 50d to the image display device 1 and performs data communications.

In this embodiment, the image display device 1 is a projector that projects the display image 80 or the display image 81 onto a screen 75 (shown in FIG. 3) or the like.

The number of computer devices 50a through 50d that transmit data to the image display device 1 is not limited to four as in FIG. 1, but may be two, three, or five or more. In the embodiment described below, the four computer devices 50a through 50d transmit image data to the single image display device 1.

Here, the computer devices 50a through 50d may be any devices that display images and cursors 82a through 82d. For example, the computer devices 50a through 50d may be personal computers that use an operating system (OS) such as Windows (a registered trademark), Macintosh (a registered trademark), LINUX (a registered trademark), MS-DOS (a registered trademark), and PDAs (Personal Digital Assistants, handheld terminals), workstations, mainframe computers, or the likes.

Mice 51a through 51d that are a kind of pointing device are connected to the computer devices 50a through 50d. When an operator operates one of the mice 51a through 51d, a pointing device signal obtained through the operation is output to the computer devices 50a through 50d. Examples of pointing device signals include "cursor position information data" and "pointing device press signals". "Cursor position information data" may be numerical data represented by an X-coordinate and a Y-coordinate, like (Xp, Yp). The X-coordinate and Y-coordinate data two-dimensionally represent the positions of the cursors 82a through 82d. When an operator moves a mouse 51 as a pointing device vertically and horizontally, the numeric values of the X-coordinate and the Y-coordinate of the "cursor position information data" are increased and reduced. A "pointing device pressing signal" is a signal that is output when an operator presses a button of a mouse 51 as a pointing device, and may be a "click" signal that is output when the operator quickly releases the button of the pointing device, or a "drag" signal that is output when the operator moves the pointing device while keeping pressing the button until the operator releases the button. Pointing devices are not limited to the mousse 51, but may be track balls, track pads, pointing sticks, pen tablets, or the likes. In a case where the cursors 82 are operated with keyboards 52, the keyboard 52 is also counted as pointing devices. In the following description, the mice 51 are used as pointing devices.

The display image 80 is an image that shows display frames 85a through 85d and the cursors 82a through 82d to be displayed on the computer devices 50a through 50d and arranged in one area in a non-overlapping manner. The display frames 85a through 85d contain buttons, dialog boxes, window regions 86a through 86d and 87a through 87d, and the likes. The cursors 82a through 82d of the respective computer devices 50a through 50b shown in the display image 80 can be handled with the mice 51 of the respective computer devices 50a through 50d, and can be moved across the display frames 85a through 85d.

The display image 81 is an image that shows the display frames 85a through 85d and the cursors 82a through 82d overlapped in one area and combined with one another on the computer devices 50a through 50d. The cursors 82a through 82d of the computer devices 50a through 50b shown in the display image 81 can be handled with the mice 51 of the respective computer devices 50a through 50d.

The image display device 1 of the present invention can display one or both of the display image 80 and the display image 81 shown in FIG. 1.

When regular computer devices 50a through 50d are used and obtain the "cursor position information data" or a "pointing device pressing signal", the cursors 82 shown on the display are moved in accordance with the "cursor position information data" or the "pointing device pressing signal", and the "cursor position information data" or the pointing device pressing signal" is transferred to the application programs of the computer devices 50a through 50d.

In the embodiments of the present invention, however, the computer devices 50a through 50d do not move the cursors 82a through 82d and do not transfer the "cursor position information data" and the "pointing device pressing signal" to the application programs, but have the function to transmit the "cursor position information data" and the "pointing device pressing signal" to the image display device 1 via the communication means 60.

Also, in the embodiments of the present invention, the computer devices 50a through 50d have the function to transmit the "cursor position information data" and the "pointing device pressing signal" of an input unit such as the keyboard 52 to the image display device 1 via the communication means 60.

The computer devices 50a through 50d have the function to receive "cursor position information data" or a "pointing device pressing signal" from the image display device 1, and transfer the "cursor position information data" or the "pointing device pressing signal" to the application programs of the computer devices 50a through 50d.

In the embodiment illustrated in FIG. 1, the cursors 82a through 82d displayed by the image display device 1 can be moved by handling the mice 51a through 51d connected to the computer devices 50a through 50d.

The image display device 1 also has the function to receive image data from the computer devices 50a through 50d connected to the image display device 1 via the communication means 60, and displays the display image 80 or the display image 81 in accordance with the image data.

The image display device 1 also has the function to receive the "cursor position information data" from the computer devices 50a through 50d connected to the image display device 1 via the communication means 60, and causes the display image 80 or the display image 81 to show the images of the cursors 82a through 82d in accordance with the received "cursor position information data".

The image display device 1 has the function to determine which one of the computer devices 50a through 50d is transmitting the image data of the display frames 85a through 85d, from which one of the display frames 85a through 85d has one of the cursors 82a through 82d located therein. The image display device 1 then transmits the "cursor position information data" or the "pointing device pressing signal" to the subject one of the computer devices 50a through 50d.

In this manner, the "cursor position information data" or the "pointing device pressing signal" of one of the cursors 82a through 82d displayed on the image display device 1 can be transmitted to one of the computer devices 50a through 50d outputting one of the display frames 85a through 85d having one of the cursors 82a through 82d located therein. The operators operating the plurality of computer devices 50a through 50d can handle the buttons, the dialog boxes, and the window regions 86a through 86d and 87a through 87d shown on the display image 80 or the display image 81.

Accordingly, the operator who is operating one of the computer devices 50a through 50d while looking at the display image 80 or the display image 81 displayed on the image display device 1 can handle the images of the buttons, the dialog boxes, and the window regions 86a through 86d and 87a through 87d output from the other three of the computer devices 50a through 50d. Thus, when making a modification to an image displayed on the image display device 1, the operators of the computer devices 50a through 50d can cooperate with one another, and can make direct modifications, without a modification instruction issued to the operator of the one of the computer devices 50a through 50d displaying the image.

Next, the communication means 60 is described. As shown in FIG. 1, the communication means 60 includes a hub 61 the plurality of having communication lines 62 and 63 connected thereto, the communication lines 62 that connect the hub 61 to the plurality of computer devices 50a through 50d, and the communication line 63 that connects the hub 61 to the image display device 1. The communication lines 62 are connected to the network connecting units of the computer devices 50a through 50d. The communication line 63 is connected to the network connecting unit 10 of the image display device 1 shown in FIG. 2.

The network connecting units of the computer devices 50a through 50d, and the interface of the network connecting unit 10 of the image display device 1 may be LANs (Local Area Networks), USBs (Universal Serial Buses, including USB 1.0, USB 1.1, and USB 2.0), IEEE 1394, RS 232, RS 422, or other communication interfaces. The communication lines 62 and 63 are communication lines compatible with those interfaces.

The communication means 60 may involve wireless communications. In such a case, the interfaces may be wireless LANs compliant with IEEE 802, Bluetooth, or other wireless interfaces. In this case, the network connecting units of the computer devices 50a through 50d, and the network connecting unit 11 of the image display device 1 are formed with the wireless interfaces.

Figure 3:
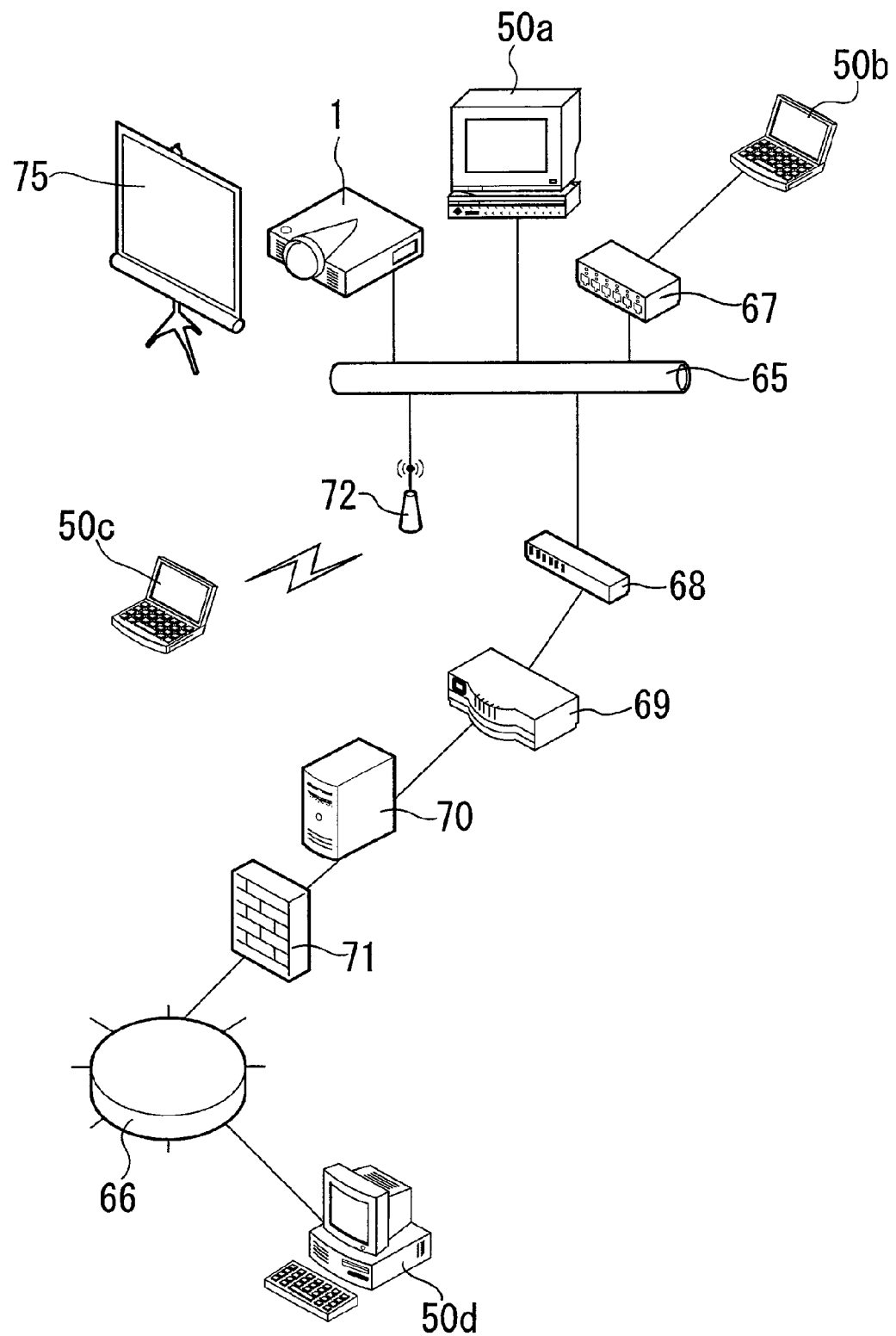
FIG. 3 illustrates an example interconnection of elements in an image display system according to one or more aspects described herein.

As shown in FIG. 3, the communication means 60 shown in FIG. 1 may include the Internet and an intranet. The computer devices 50a through 50d may be connected to networks such as an intranet and the Internet, and transmit "image data", "cursor position information data", and "pointing device pressing signals" to the image display device 1. In FIG. 3, reference numeral 65 indicates an intranet, reference numeral 66 indicates the Internet, reference numeral 67 indicates a hub, reference numeral 68 indicates a switch, reference numeral 69 indicates a router, reference numeral 70 indicates a server, reference numeral 71 indicates a firewall, and reference numeral 72 indicates an access point of a wireless LAN.

In the following, the image display device 1 is described. The network connecting unit 10 serves as a receiving unit 10a that receives "image data", "cursor position information data", and "pointing device pressing signals" transmitted from the computer devices 50a through 50d via the communication means 60.

Figure 2:
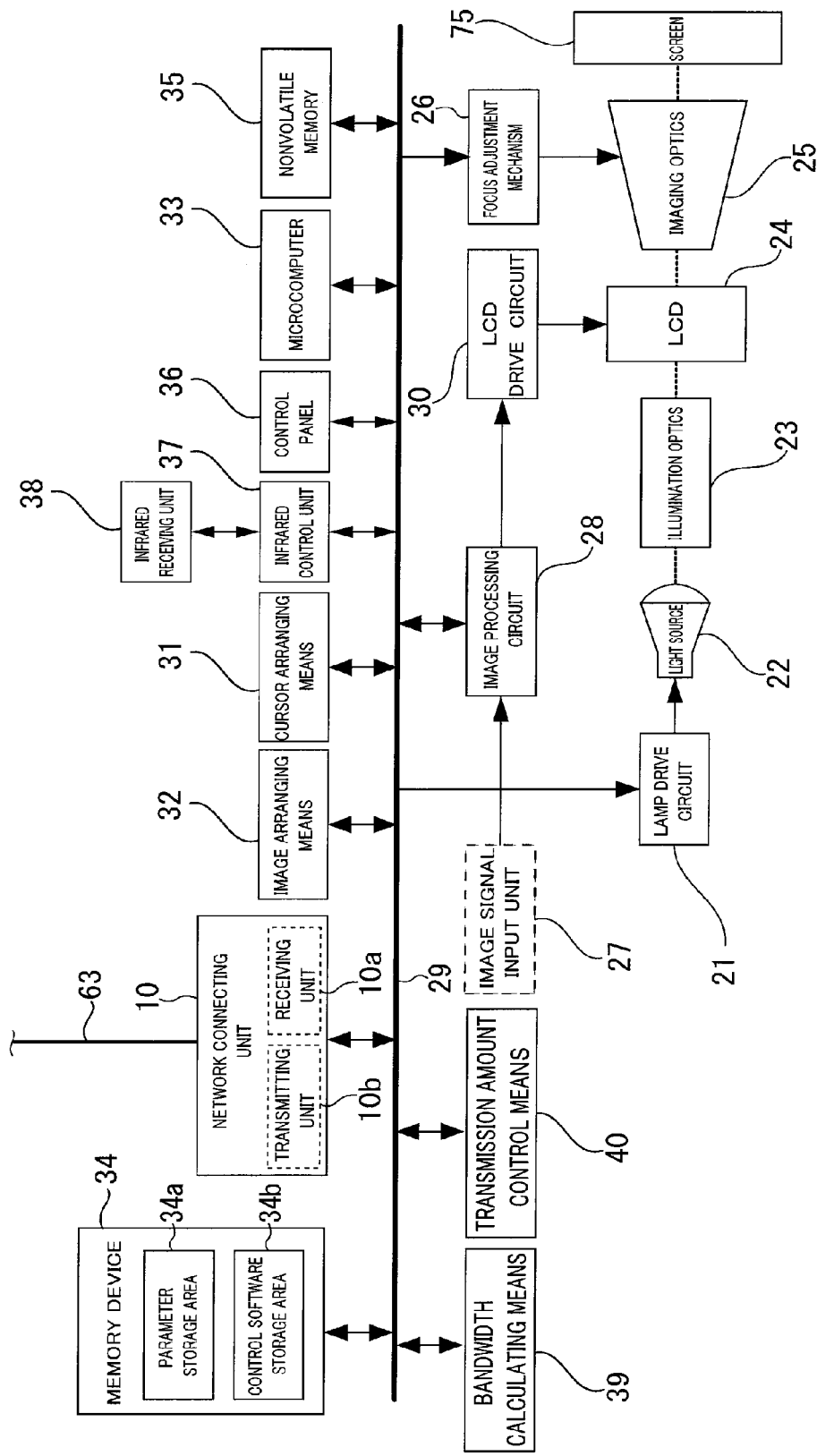
FIG. 2 illustrates an example image display device according to one or more aspects described herein.

As shown in FIG. 2, the image display device 1 includes: a light source 22 such as a lamp that emits light by the electric power supplied from a lamp drive circuit 21; an illumination optics 23 that gathers diffused light from the light source 22, and illuminates a LCD (Liquid Crystal Display) 24 with more homogeneous illumination light; the LCD 24 that generates an image by receiving the illumination light and expressing gradation on each pixel; and an imaging optics 25 that projects the image generated by the LCD 24 onto the screen 75. Instead of the LCD 24, it is possible to use a DMD (Digital Micromirror Device). The imaging optics 25 is formed with a large number of lenses. The imaging optics 25 is automatically brought to a focus by a focus adjustment mechanism 26, and the illumination light transmitted through the LCD 24 forms an image on the screen 75.

The image display device 1 has an image signal input unit 27 such as a D-SUB terminal or a DVI-D terminal that obtains image signals from computers. In the present invention, however, the "image data", the "cursor position information data", and the "pointing device pressing signals" transmitted from the computer devices 50a through 50d are received by the network connecting unit 10. Therefore, the image signal input unit 27 is not necessarily provided in the display device 1 of the present invention.

Reference numeral 31 indicates a cursor arranging means that obtains, via a bus 29, the "cursor position information data" transmitted from the computer devices 50a through 50d and obtained by the receiving unit 10a. The cursor arranging means 31 sets the cursor 82 to the position in the display image 80 or the display image 81 determined by the "cursor position information data". The cursor arranging means 31 then generates an image of the cursor 82, and places the image at the set position.

Reference numeral 32 indicates an image arranging means that obtains, via the bus 29, the "image data" transmitted from the computer devices 50a through 50d and obtained by the receiving unit 10a. The image arranging means 32 generates the display frames to be displayed on the computer devices 50a through 50d, in accordance with the "image data". The image arranging means 32 then arranges the display frames in the display image 80 in a non-overlapping manner, or in the display image 81 in an overlapping manner.

Reference numeral 28 indicates an image processing circuit that obtains, via the bus 29, image data that has been input through the image signal input unit 27 or image data that has been subjected to image processing by the cursor arranging means 31 and the image arranging means 32 respectively. The image processing circuit 28 performs further image processing such as sharpness correction, gamma correction, contrast correction, white balance correction, or trapezoidal correction, when necessary. Reference numeral 30 indicates a LCD drive circuit that outputs a signal electrode drive signal to be applied to the signal electrode of the LCD 24, and a scan electrode drive signal to be applied to the scan electrode of the LCD 24, based on the "image data" obtained from the image processing circuit 28. The LCD 24 generates images based on the signal electrode drive signal and the scan electrode drive signal obtained from the LCD drive circuit 30.

Reference numeral 33 indicates microcomputer that performs various control operations such as a collective control operation on the bus 29. The control operations include a control operation in which the one of the computer devices 50a through 50d transmitting the image data of the display frames 85a through 85d is determined from one of the display frames 85a through 85d having one of the cursors 82a through 82d located therein, and "cursor position information data" or a "pointing device pressing signal" is output to the transmitting unit 10b, so as to transmit the "cursor position information data" or the "pointing device pressing signal" to the subject one of the computer devices 50a through 50d.

The network connecting unit 10 also serves as the transmitting unit 10b, and transmits various kinds of data to the computer devices 50a through 50d. The various kinds of data include "cursor position information data" and "pointing device pressing signals".

Reference numeral 34 indicates a memory device that involves a hard disk, a ROM (Read Only Memory), a flash memory, or the like. The memory device 34 has a parameter storage area 34a, a control software storage area 34b, and the likes. The memory device 34 is connected to the bus 29. The parameter storage area 34a stores the later described "image data bandwidth" of the computer devices 50a through 50d. The control software storage area 34b stores application software for collectively controls the image display device 1.

Reference numeral 35 indicates a nonvolatile memory such as a ROM (Read Only Memory) or a flash memory, and stores data about various set conditions for the image display device 1.

Reference numeral 36 indicates a control panel that is designed to changes various settings of the image display device 1. The various settings include: selecting a display image between the display image 80 and the display image 81; changing, on the display image 80, the areas of the display frames 85a through 85d displayed on the computer devices 50a through 50d; and changing the locations of the display frames 85a through 85d. Reference numeral 37 indicates an infrared control unit that obtains, via an infrared receiving unit 38, changes in the various settings of the image display device 1 made by operators with the use of a remote controller (not shown). The infrared control unit 37 then changes the various settings of the image display device 1.

Reference numeral 39 indicates a bandwidth calculating means that is connected to the bus 29. Based on at least one kind of information about the locations and movement of the cursors 82a through 82d displayed in the display image 80 or the display image 81, the bandwidth calculating means 39 calculates the bandwidth of the "image data" transmitted from the plurality of computer devices 50a through 50d.

Reference numeral 40 indicates a transmission amount control means that is connected to the bus 29. Based on the "image data bandwidth" calculated by the bandwidth calculating means 39, the transmission amount control means 40 controls the amount of data transmission from the plurality of computer devices 50a through 50d to the image display device 1.

Next, the "bandwidth" used when the computer devices 50a through 50d transmit "image data" and "cursor position information data" to the image display device 1 are described. The "maximum transmission bandwidth" for transmitting data such as the "image data" and the "cursor position information data" from each of the computer devices 50a through 50d to the image display device 1 is set beforehand in the image display device 1, in accordance with the type of the interface of the network connecting unit 10.

The bandwidth calculating means 39 always maintains the "bandwidth of the cursor position information data" to be transmitted from each of the computer devices 50a through 50d at a predetermined value or higher. The bandwidth equal to or higher than the predetermined value should be large enough to facilitate the movements of the cursors 82a through 82d displayed on the display image 80 or the display image 81.

The transmission amount control means 40 transmits the "bandwidth of the cursor position information data" maintained by the bandwidth calculating means 39, to the computer devices 50a through 50d via the network connecting unit 10 serving as the transmitting unit 10b. Each of the computer devices 50a through 50d obtains the "bandwidth of the cursor position information data", and transmits the "cursor position information data" to the image display device 1, with the "bandwidth of the cursor position information data" being the upper limit. In this manner, the bandwidth calculating means 39 always maintains the "bandwidth of the cursor position information data" at the predetermined value or higher, and transmits the "bandwidth of the cursor position information data" to the plurality of computer devices 50a through 50d, so as to control the amount of transmission of the "cursor position information data" from the plurality of computer devices 50a through 50d to the image display device 1. Accordingly, the influence of the number of computer devices 50 connected to the image display device 1 and the data amount of the "image data" to be transmitted from the computer devices 50 is eliminated. Thus, the movements of the cursors 82a through 82d displayed on the display image 80 or the display image 81 can be made smoother.

Figure 4:
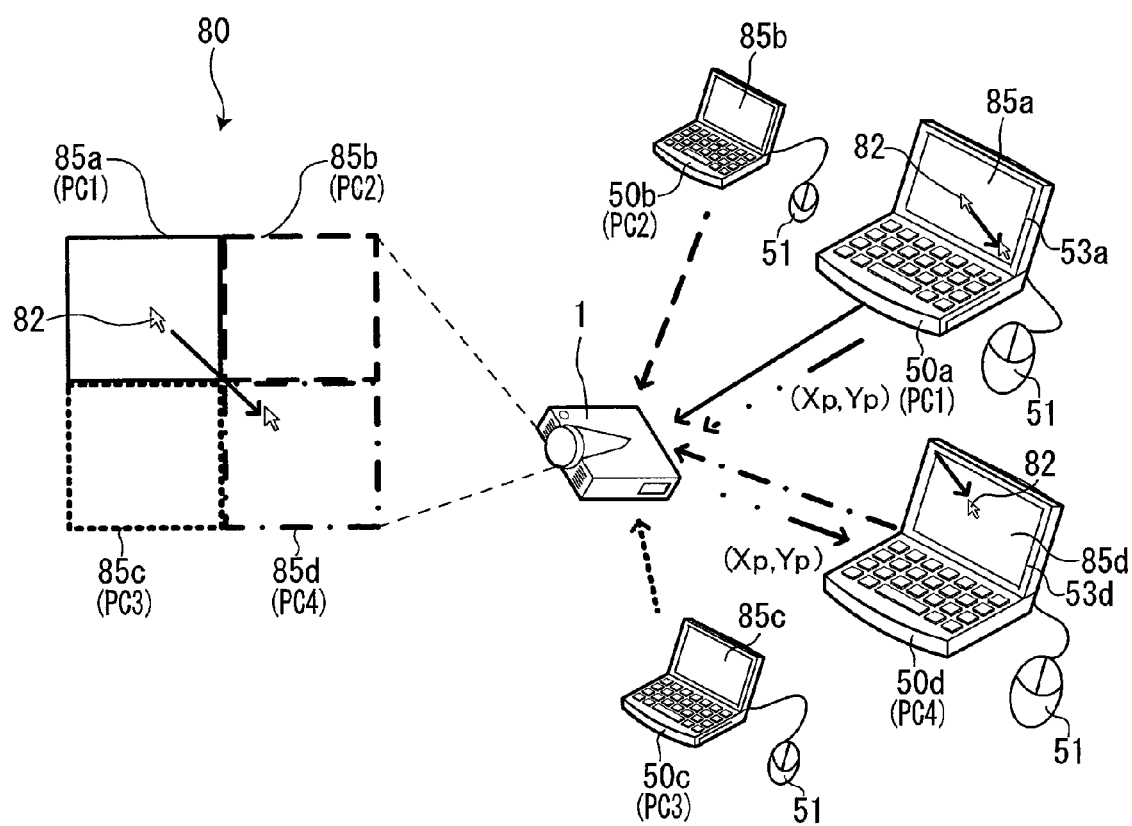
FIG. 4 illustrates an example display image according to one or more aspects described herein.
Figure 5:
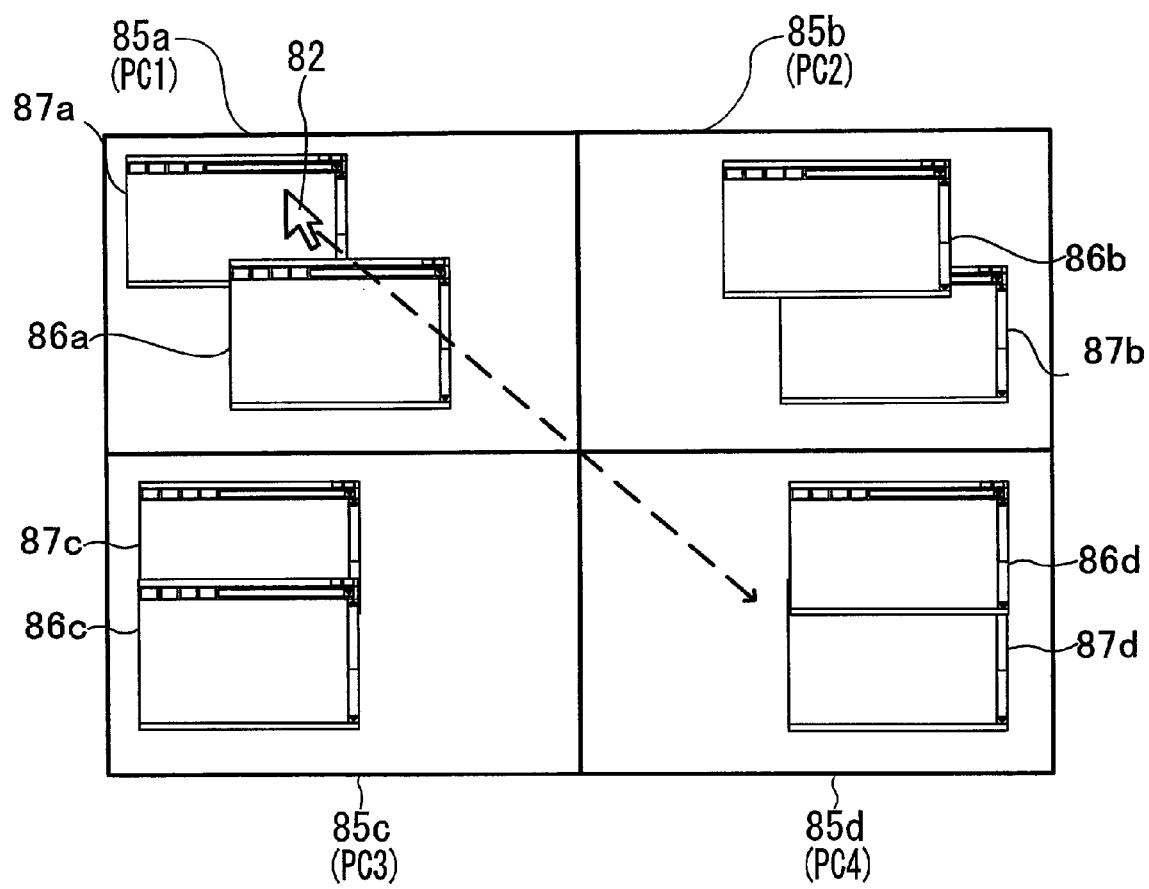
FIG. 5 illustrates another view of the example display image of FIG. 4 according to one or more aspects described herein.
Figure 6:
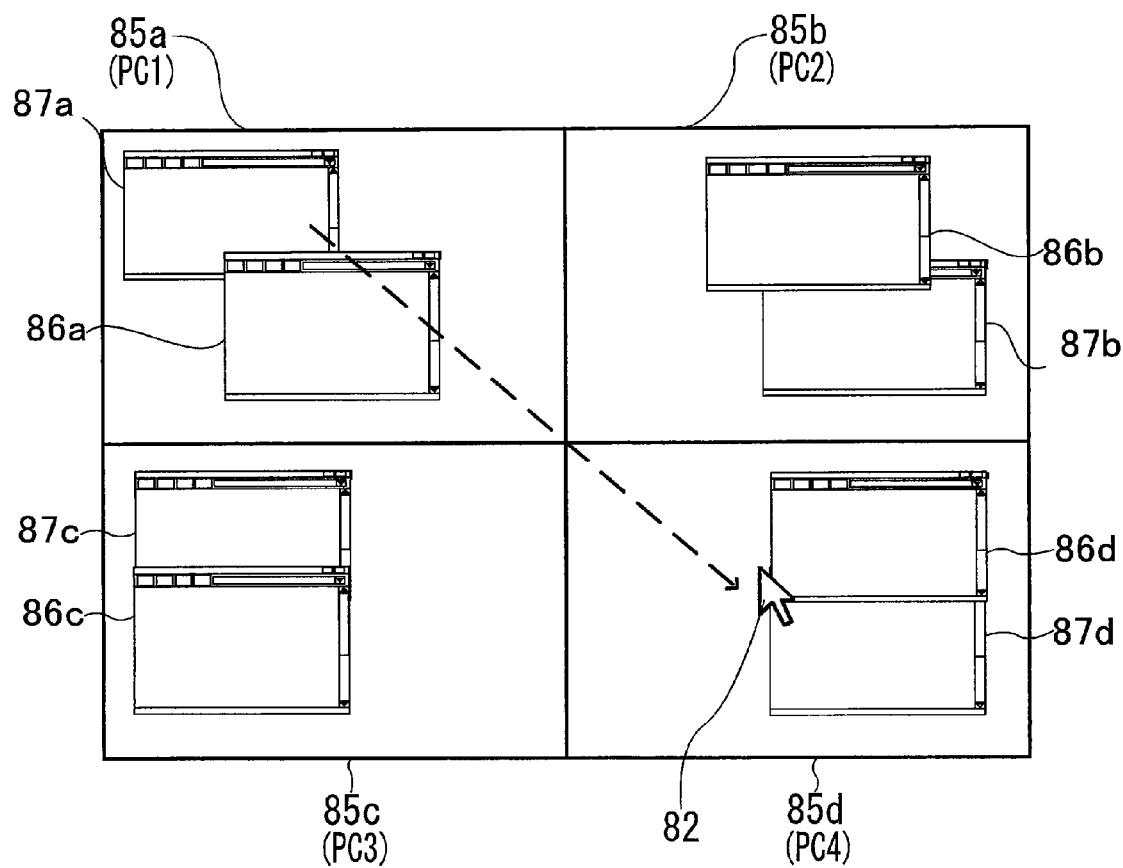
FIG. 6 illustrates an additional view of the example display image of FIG. 4 according to one or more aspects described herein.
Figure 7:
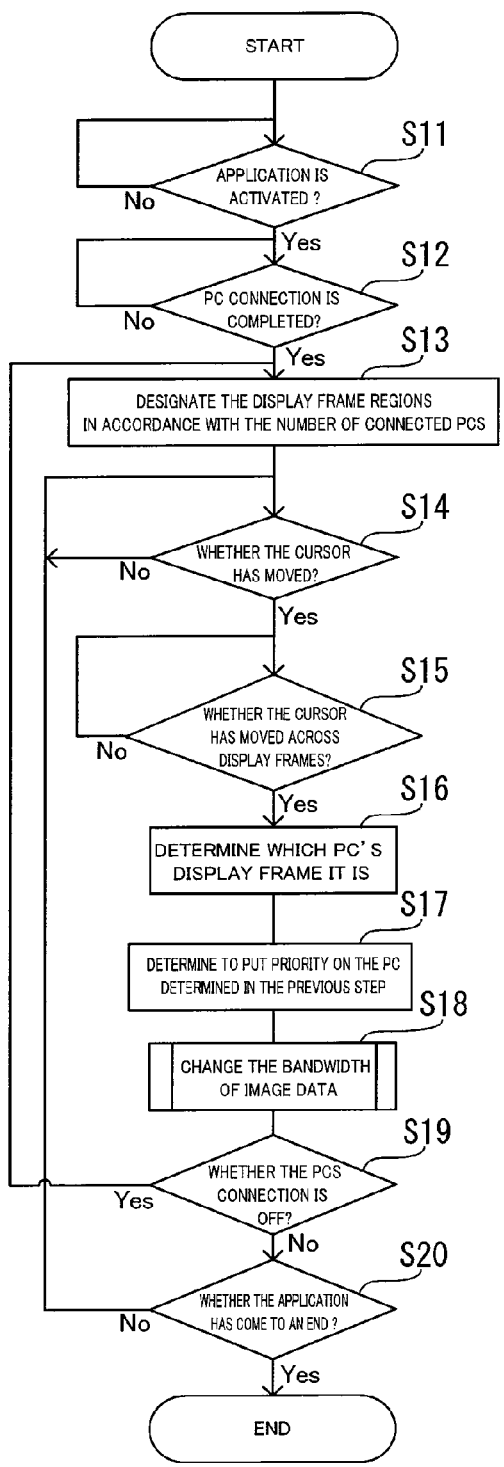
FIG. 7 illustrates an example flowchart of an operation to be performed in a first embodiment according to one or more aspects described herein.

FIG. 4 illustrates the display image 80 displayed in a case where there is only one cursor 82. FIGS. 5 and 6 further illustrate the closer display image 80 of FIG. 4. FIG. 7 is a flowchart of an operation to be performed in a first embodiment that is described in the following.

According to the flowchart shown in FIG. 7, when the image display device 1 is activated, the application software stored in the control software storage area 34b is activated, the operation moves from the processing of step S11 to determine "application is activated?" on to the processing of step S12 to determine "PC connection is completed?"

In the determining step S12, a determination is made as to whether the computer devices 50 are connected to the image display device 1 via the communication means 60. If the computer devices 50 are determined to be connected to the image display device 1, the operation move on to the processing of step S13 "designate the display frame regions in accordance with the number of connected PCs".

In the processing of step S13, the number of connected computer devices 50 is counted, and the image arranging means 32 designates the regions of the display frames 85 in the display image 80 in accordance with the number of connected computer devices 50. Based on the "image data" transmitted from the computer devices 50, the image arranging means 32 generates the display frames 85 to be displayed on the respective computer devices 50, and arranges the display frames 85 on the display image 80 in a non-overlapping manner. In a case where the four computer devices 50a through 50d are connected to the image display device 1 via the communication means 60, as in this embodiment, the image arranging means 32 designates the regions of the display frames 85a through 85d formed by dividing the display image 80 by four, two in the transverse direction and two in the vertical direction. The image arranging means 32 then generates the display frames 85a through 85d to be displayed on the computer devices 50a through 50d, and arranges the display frames 85a through 85d in conformity with the designated regions.

As shown in FIG. 5, the window regions 86a through 86d and 87a through 87d shown on the computer devices 50a through 50d are displayed in the display frames 85a through 85d.

In the first embodiment, if the operators of the computer devices 50a through 50d do not handle the mice 51 in a predetermined period of time, the image of the cursor 82 disappears from the display image 80.

In a case where the operator of the computer device 50a first handles the mouse 51 after the image display device 1 is activated, the "cursor position information data" is transmitted from the computer device 50a to the receiving unit 10a via the communication means 60. Upon receipt of the "cursor position information data", the receiving unit 10*a* outputs the "cursor position information data" to the cursor arranging means 31 via the bus 29.

Based on the "cursor position information data", the cursor arranging means 31 sets the cursor positions in the display image 80, and generates and arranges the image of the cursor 82 in the display image 80. Since the operator of the computer device 50*a* first handles the mouse 51*a* after the image display device 1 is activated, the cursor 82 displayed on the computer device 50*a* is placed in the display frame 85*a* displayed on the computer device 50*a*, as shown in FIG. 5. After the processing of step S13 is completed, the operation move on to the processing of step S14 to determine "whether the cursor has moved?".

If the cursor 82 is determined to have moved in the determining processing of step S14, the operation move on to the processing of step S15 to determine "whether the cursor has moved across display frames?.

When the operator of the computer device 50*a* handles the mouse 51*a* to move the cursor 82 toward the display frame 85*d*, the cursor 82 displayed on the display image 80 moves across the display frame 85*a* and the display frame 85*d*, and is displayed in the display frame 85*d*. In this case (the situation shown in FIG. 6), in the determining processing of step S15, the operation move on to the processing of step S16 to "determine which PC's display frame it is".

While the operator of the computer device 50*a* is handling the mouse 51*a*, the computer device 50*a* keeps transmitting the "cursor position information data" to the receiving unit 10*a*, and the cursor arranging means 31 places and displays the cursor 82 in the display image 80.

While moving from the display frame 85*a* to the display frame 85*d*, the cursor 82 displayed on the display image 80 disappears from the display 53*a* of the computer device 50*a*. Still, the operator of the computer device 50*a* can keep handling the cursor 82 displayed on the display image 80.

In the processing of step S16, the computer device 50*d* transmitting the image data of the display frame 85*d* is determined, since the cursor 82 is located in the display frame 85*d*. The transmitting unit 10*b* then transmits the "cursor position information data" or the "pointing device pressing signal" to the computer device 50*d*.

Receiving and obtaining the "cursor position information data" or the "pointing device pressing signal", the computer device 50*d* displays a cursor 82 on the display 53*d* of the computer device 50*d*, based on the "cursor position information data" or the "pointing device pressing signal". The computer device 50*d* then transfers the "cursor position information data" or the "pointing device pressing signal" to the application program of the computer device 50*d*.

Accordingly, the operator of the computer device 50*a* can operate the buttons, dialog boxes, and the window regions 86*d* and 87*d* displayed in the display frame 85*d*. After the determining processing of step S16 is completed, the operation move on to the processing of step S17 to "determine to put priority on the PC determined in the previous step".

In the processing of step S17, the bandwidth calculating means 39 determines to put priority on the computer device 50*d* displaying the display frame 85*d* having the cursor 82 located therein. After the processing of step S17 is completed, the operation move on to the processing of step S18 to "change the bandwidth of image data".

In the processing of step S18, the bandwidth calculating means 39 performs an operation to increase the bandwidth for transmitting the "image data" of the display frame 85*d* of the computer device 50*d* determined to have a priority. In this manner, the bandwidth calculating means 39 changes the bandwidth (hereinafter referred to as the "image data bandwidth") for transmitting image data of the display frames 85*a* through 85*d* of the respective computer devices 50*a* through 50*d* connected to the image display device 1 to the receiving unit 10*a*.

As described above, the "maximum transmission bandwidth" is set beforehand in the image display device 1, depending on the interface of the network connecting unit 10. The bandwidth calculating means 39 sets the value obtained by subtracting the "bandwidth of the cursor position information data" from the "maximum transmission bandwidth", as the "maximum bandwidth of image data" to be used for transmitting "image data" from the respective computer devices 50*a* through 50*d* to the image display device 1. Hereinafter, the method of calculating the bandwidth of image data of the respective computer devices 50*a* through 50*d* when the "maximum bandwidth of image data" is 100 Mbps is described in detail.

In the processing of step S18, the bandwidth calculating means 39 performs the following processing. A "predetermined priority level" (1, for example) is assumed to be allotted to each of the computer devices 50*a* through 50*d* in advance. In a case where one of the computer devices 50 displays the display frame 85 having the cursor 82 located therein, the numeric value obtained by adding a "predetermined numeric value" (1, for example) to the "predetermined priority level" is set as the "priority level" of the computer device 50. For example, in a case where the "predetermined priority level" is 1 and the "predetermined numeric value" is 1, the "priority level" of the computer device 50 displaying the display frame 85 having the cursor 82 located therein is 2. In this case, the "priority level" of the other computer devices 50 is 1. The "image data bandwidth" of each of the computer devices 50*a* through 50*d* is calculated by dividing 100 Mbps, which is the maximum bandwidth, by the value obtained by adding up all the "priority levels" of the computer devices 50*a* through 50*d*, and then multiplying the resultant value by the "priority level" of each of the computer devices 50*a* through 50*d*. The "predetermined priority level" and the "predetermined numeric value" are not limited to 1, but may be set to any value.

If the "predetermined priority level" and the "predetermined numeric value" are both 1, the respective computer devices 50*a* through 50*d* have the priority levels shown in Table 1.

TABLE 1

| Computer device | Number of cursors in display frame | Priority level | Image data bandwidth |
|---|---|---|---|
| 50a | 1 | 2 | 40 Mbps |
| 50b | 0 | 1 | 20 Mbps |
| 50c | 0 | 1 | 20 Mbps |
| 50d | 0 | 1 | 20 Mbps |
| total | 1 | 5 | 100 Mbps |

As is apparent from Table 1, the "image data bandwidth" of the computer device 50*a* displaying the display frame 85*a* having the cursor 82 located therein is higher than the "image data bandwidth" of any of the other computer devices 50*b*, 50*c*, and 50*d*.

Since the cursor 82 is located in the display frame 85*d* in the situation shown in FIG. 6 where the "predetermined priority level" and the "predetermined numeric value" are both 1, the respective computer devices 50*a* through 50*d* in such a case have the priority levels shown in Table 2.

TABLE 2

| Computer device | Number of cursors in display frame | Priority level | Image data bandwidth |
|---|---|---|---|
| 50a | 0 | 1 | 20 Mbps |
| 50b | 0 | 1 | 20 Mbps |
| 50c | 0 | 1 | 20 Mbps |
| 50d | 1 | 2 | 40 Mbps |
| total | 1 | 5 | 100 Mbps |

As is apparent from Table 2, the "image data bandwidth" of the computer device 50d displaying the display frame 85d having the cursor 82 located therein is higher than the "image data bandwidth" of any of the other computer devices 50a, 50b, and 50c. As described above, when the cursor 82 moves across between the display frame 85a and the display frame 85d by the determination of step S15, the bandwidth calculating means 39 changes the "image data bandwidth" of each of the computer devices 50a through 50d in the processing of step S18.

As the bandwidth calculating means 39 changes the "image data bandwidth" of each of the computer devices 50a through 50d, the transmission amount control means 40 transmits the "image data bandwidth" of each of the computer devices 50a through 50d, to each of the computer devices 50a through 50d. Each of the computer devices 50a through 50d is designed to transmit image data to the image display device 1, with the "image data bandwidth" being the upper limit.

Figure 8:
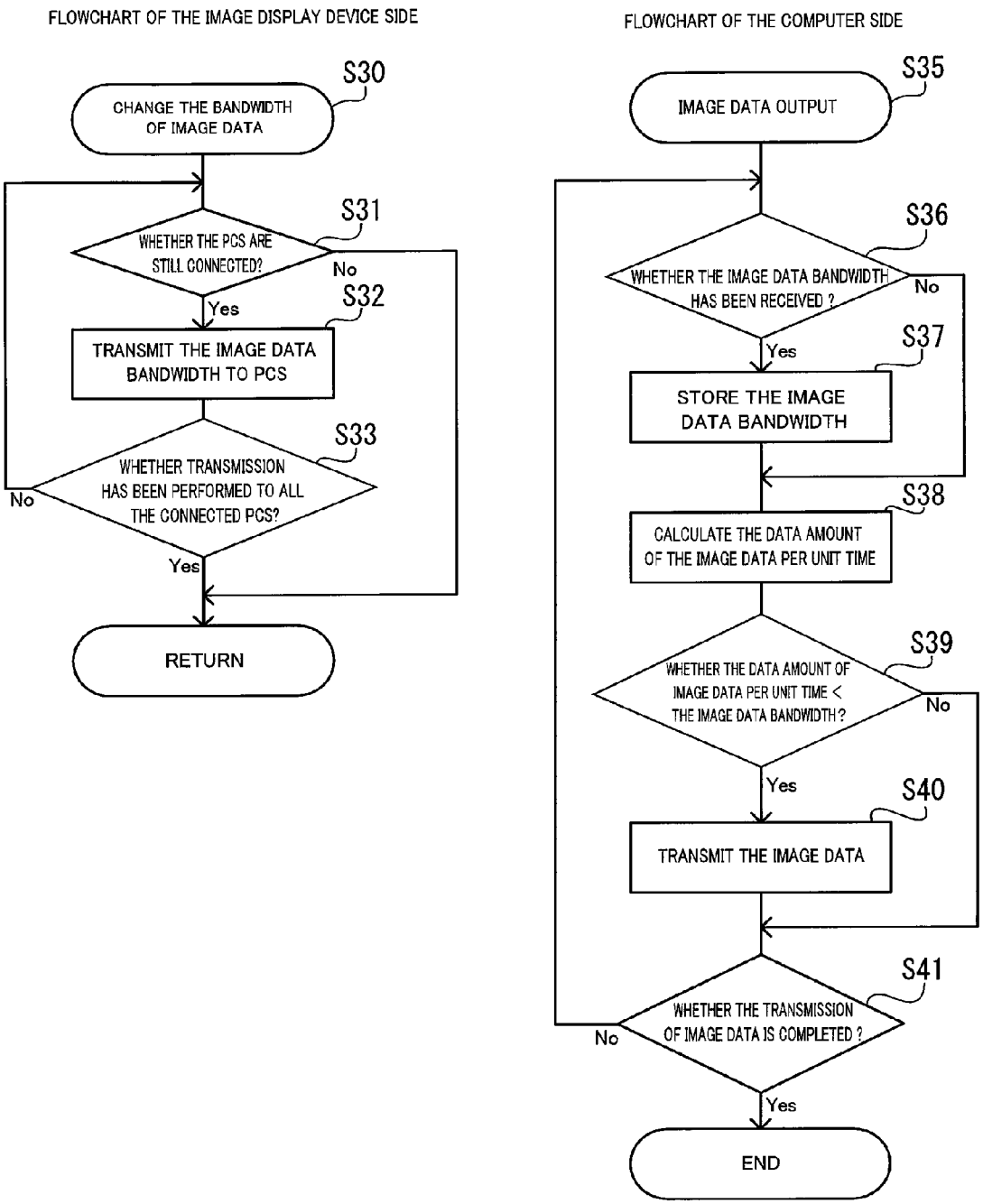
FIG. 8 illustrates example flowcharts of operations to be performed at an image display device side and at a computer side according to one or more aspects described herein.

FIG. 8 shows flowcharts of operations to be performed to transmit the "image data bandwidth" to each of the computer devices 50a through 50d and to control the transmission amount of "image data" to be transmitted to each of the computer devices 50a through 50d. In the following, the operations shown in the flowcharts are described.

First, the flowchart of the image display device side shown in FIG. 8 is described. In the processing of step S18, after the bandwidth calculating means 39 changes the "image data bandwidth" of each of the computer devices 50a through 50d, the operation moves from the processing of step S30 to "change the bandwidth of image data" on to the processing of step S31 to determine "whether the PCs are still connected?". In the determining processing of step S31, a determination is made as to whether the computer devices 50a through 50d are still connected to the image display device 1 via the communication means 60.

In step S31, if the computer devices 50 are determined to be still connected to the image display device 1, the operation moves on to the processing of step S32 to "transmit the image data bandwidth to PCs". In the processing of step S32, the transmission amount control means 40 transmits the "image data bandwidth" of each of the computer devices 50a through 50d from the network connecting unit 10 serving as the transmitting unit 10b to each of the computer devices 50a through 50d. The operation then moves on to the processing of step S33 to determine "whether transmission has been performed to all the connected PCs?".

On the other hand, in the processing of step S31, if the computer devices 50 are determined not to be connected to the image display device 1, the operation returns to step S30.

In step S33, if the transmission of the "image data bandwidth" of all the computer devices 50 connected to the image display device 1 is determined to be completed, the operation moves on to step S30.

On the other hand, in step S33, if the transmission of the "image data bandwidth" of all the computer devices 50 connected to the image display device 1 is determined not to be completed, the operation returns to the determining processing of step S31.

The flowchart of the computer side shown in FIG. 8 is now described. When a computer device 50 transmits "image data" to the image display device 1, the operation moves from the processing of step S35 to "image data output" on to the processing of step S36 to determine "whether the image data bandwidth has been received?".

In the determining processing of step S36, if the "image data bandwidth" transmitted from the image display device 1 has been received by the computer device 50, the operation moves on to the processing of step S37 to "store the image data bandwidth". In the processing of step S37, the "image data bandwidth" is stored in the memory device of the computer device 50, and the operation moves onto the processing of step S38 to "calculate the data amount of the image data per unit time".

In the processing of step S38, the "image data" that is output from the OS or application software is stored in a FIFO (First In, First Out) buffer. The data amount of the stored "image data" is divided by a "predetermined time", so as to calculate the "data amount of the image data per unit time". The operation then moves on to the processing of step S39 to determine "whether the data amount of image data per unit time<the image data bandwidth". The "predetermined time" is the time elapsed since the computer device 50 ends transmitting the "image data".

If the "data amount of the image data per unit time" calculated in step S38 is determined to be smaller than the "image data bandwidth" received from the image display device 1 in the determining processing of step S39, the operation moves on to the processing of step S40 to "transmit the image data". The "image data" is then transmitted to the image display device 1. In addition, the protocols for the computer devices 50 to transmit the "image data" to the image display device 1 include both TCP (Transmission Control Protocol) and UDP (User Datagram Protocol).

If the "data amount of the image data per unit time" calculated in step S38 is determined to be larger than the "image data bandwidth" received from the image display device 1 by the computer devices 50 in the determining processing of step S39, the operation moves on to the processing of step S41 to determine "whether the transmission of image data is completed?". However, since the "image data" has not been transmitted to the image display device 1 yet, the operation returns to step S36 through the determining step of S41. When the operation moves from step S36 on to step S38, the "predetermined time" is longer than before, as a longer period of time has elapsed. The value of the "data amount of image data per unit time" then becomes smaller. In the case where the value of the "data amount of image data per unit time" is smaller than the previous data amount, if the value of the "data amount of image data per unit time", which is smaller than the previous data amount, is determined to be smaller than the "image data bandwidth" in step S39, the operation moves on to step S40, and the "image data" is transmitted to the image display device 1.

On the other hand, in step S39, if the "data amount of image data per unit time" is determined to be still larger than the "image data bandwidth", the operation moves on to the determining processing of step S41, and returns to step S36 from the determining processing of step S41. As the operation returns to step S36, a longer period of time has elapsed, and the "predetermined time" further increases. On the other hand, the "data amount of image data per unit time" decreases. When the "data amount of image data per unit time" finally becomes smaller than the "image data bandwidth", the "image data" is transmitted to the image display device 1.

In the processing of step S40, As the "image data" is transmitted to the image display device 1, the operation moves on to the processing of step S41 to determine "whether the transmission of image data is completed". When the transmission of the "image data" that is output from the OS or application software of the computer device 50 to the image display device 1 is completed, the series of processing comes to an end.

On the other hand, if the transmission of the "image data" that is output from the OS or application software of the computer device 50 to the image display device 1 is not completed, the operation returns to step S36. The processings of steps S36 through S41 are repeated until the transmission of the "image data" to the image display device 1 is completed.

When the processing of step S18 of FIG. 7 is ended, the operation moves on to the processing of step S19 to determine "Whether the PCs connection is off?". If the communications with the computer devices 50 connected to the image display device 1 via the communication means 60 are determined to be off in the determining processing of step S19, the operation returns to the processing of step S13, and the number of computer devices 50 connected to the image display device 1 is counted again. Based on the number of connected computer devices 50, the regions of the display frames 85 on the display image 80 are designated.

On the other hand, in the determining processing of step S19, if the communications with the computer devices 50 connected to the image display device 1 via the communication means 60 are determined not to be off, the operation moves on to the processing of step S20 to determine "whether the application has come to an end?".

If the application software controlling the image display device 1 has come to an end in the determining processing of step S20, the series of processing comes to an end.

On the other hand, in the determining processing of step S20, if the application software controlling the image display device 1 has not come to an end, the operation returns to the determining processing of step S14.

As described above, the "image data bandwidth" of the computer device 50*a* displaying the display frame 85*a* having the cursor 82 located therein is made higher than the "image data bandwidth" of any of the other computer devices 50*b*, 50*c*, and 50*d*. In this manner, the frame rate (the number of frames updated per unit time) of the display frame 85*a* displayed on the display image 80 becomes higher, and the display frame 85*a* that is pointed out by the cursor 82 and is drawing attention of the operator or the participants of a meeting or the like is preferentially updated, compared with the other display frames 85*b* through 85*d*. Thus, the display frame 85*a* can be made easier to see.

Next, another example case of the first embodiment where the layout of the display frames 85 on the display image 80 differs from the above example case is described.

In the processing of step S13 of FIG. 7, the sizes of the display frames 85 can be changed to desired sizes, and can be arranged on the display image 80 in a non-overlapping manner. For example, as shown in FIGS. 9 and 10, the display frame 85*a* may be made larger and placed in the upper portion of the display image 80, and the display frames 85*b* through 85*d* may be placed below the display frame 85*a* in a non-overlapping manner.

Figure 9:
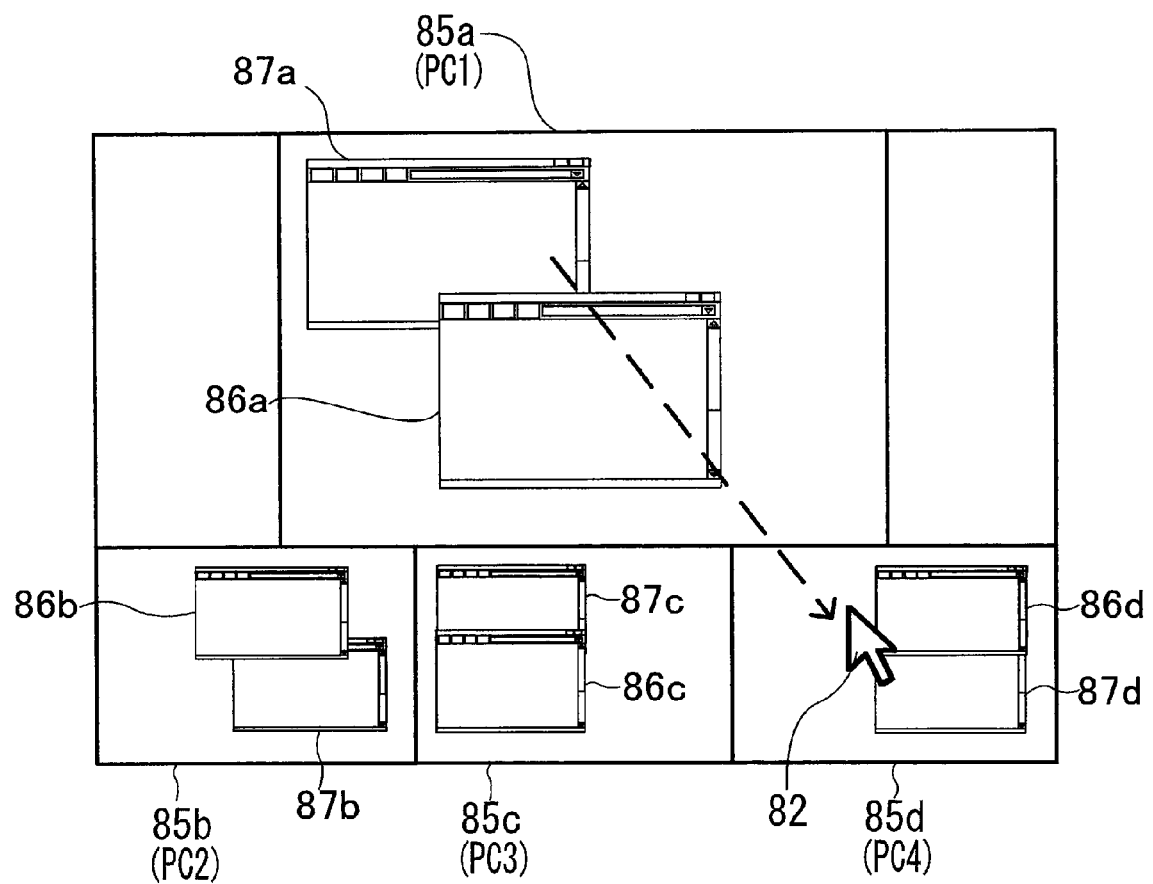
FIG. 9 illustrates an example display image according to one or more aspects described herein.
Figure 10:
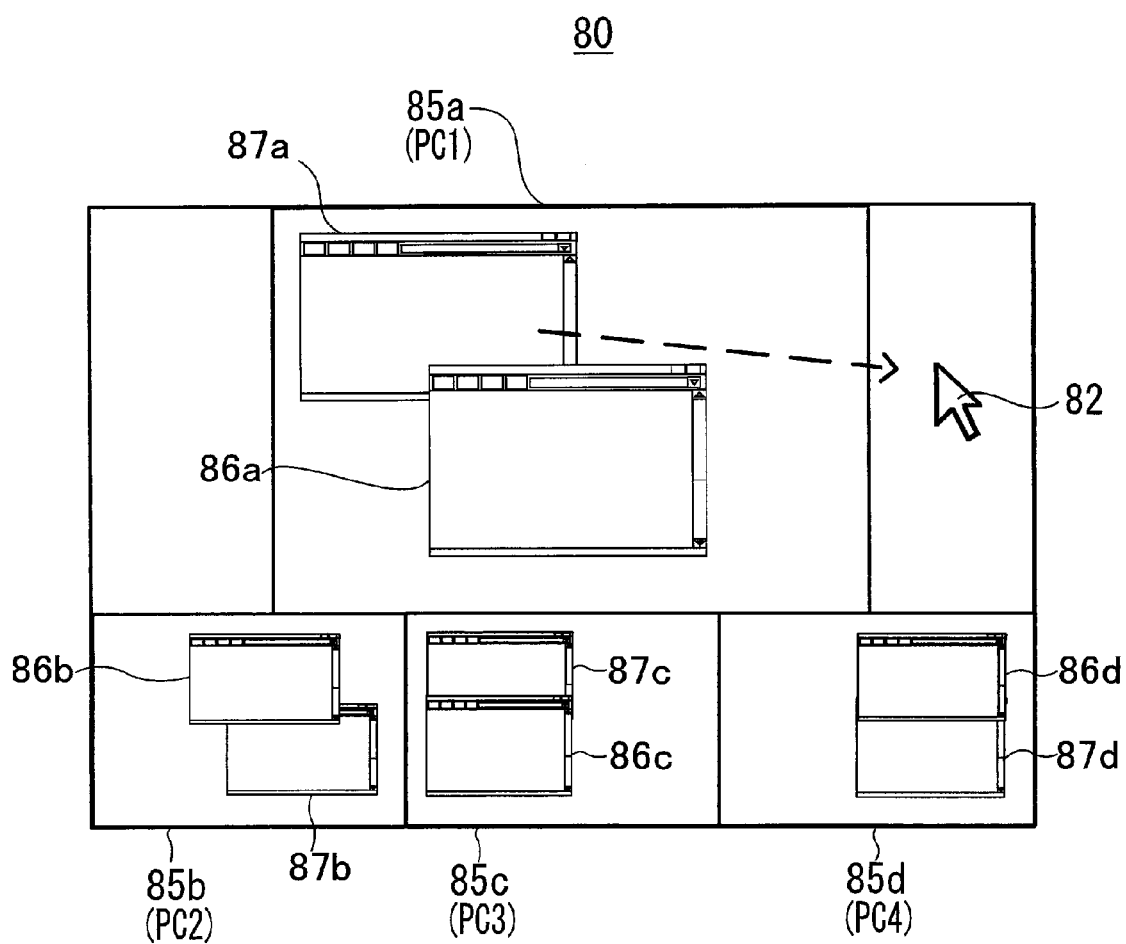
FIG. 10 illustrates another example display image according to one or more aspects described herein.

Tables 5 and 6 show the "image data bandwidth" of the respective computer devices 50*a* through 50*d* calculated by the bandwidth calculating means 39, before and after the cursor 82 is moved from the display frame 85*a* to the display frame 85*d*, as shown in FIG. 9.

TABLE 3

| Computer device | Number of cursors in display frame | Priority level | Image data bandwidth |
|---|---|---|---|
| 50a | 1 | 2 | 40 Mbps |
| 50b | 0 | 1 | 20 Mbps |
| 50c | 0 | 1 | 20 Mbps |
| 50d | 0 | 1 | 20 Mbps |
| total | 1 | 5 | 100 Mbps |

TABLE 4

| Computer device | Number of cursors in display frame | Priority level | Image data bandwidth |
|---|---|---|---|
| 50a | 0 | 1 | 20 Mbps |
| 50b | 0 | 1 | 20 Mbps |
| 50c | 0 | 1 | 20 Mbps |
| 50d | 1 | 2 | 40 Mbps |
| total | 1 | 5 | 100 Mbps |

Tables 5 and 6 show the "image data bandwidth" of the respective computer devices 50*a* through 50*d* calculated by the bandwidth calculating means 39, before and after the cursor 82 is moved from the display frame 85*a* to the outside of the area of the display frames 85*a* through 85*d*, as shown in FIG. 10.

TABLE 5

| Computer device | Number of cursors in display frame | Priority level | Image data bandwidth |
|---|---|---|---|
| 50a | 1 | 2 | 40 Mbps |
| 50b | 0 | 1 | 20 Mbps |
| 50c | 0 | 1 | 20 Mbps |
| 50d | 0 | 1 | 20 Mbps |
| total | 1 | 5 | 100 Mbps |

TABLE 6

| Computer device | Number of cursors in display frame | Priority level | Image data bandwidth |
|---|---|---|---|
| 50a | 0 | 1 | 25 Mbps |
| 50b | 0 | 1 | 25 Mbps |
| 50c | 0 | 1 | 25 Mbps |
| 50d | 0 | 1 | 25 Mbps |
| total | 0 | 4 | 100 Mbps |

As shown in Table 6, when the cursor 82 is moved out of the area of the display frames 85*a* through 85*d*, each of the computer devices 50*a* through 50*d* have the same "priority level" of 1, and have the same "image data bandwidth", as the cursor 82 does not exist in any of the display frames 85*a* through 85*d*.

Figure 11:
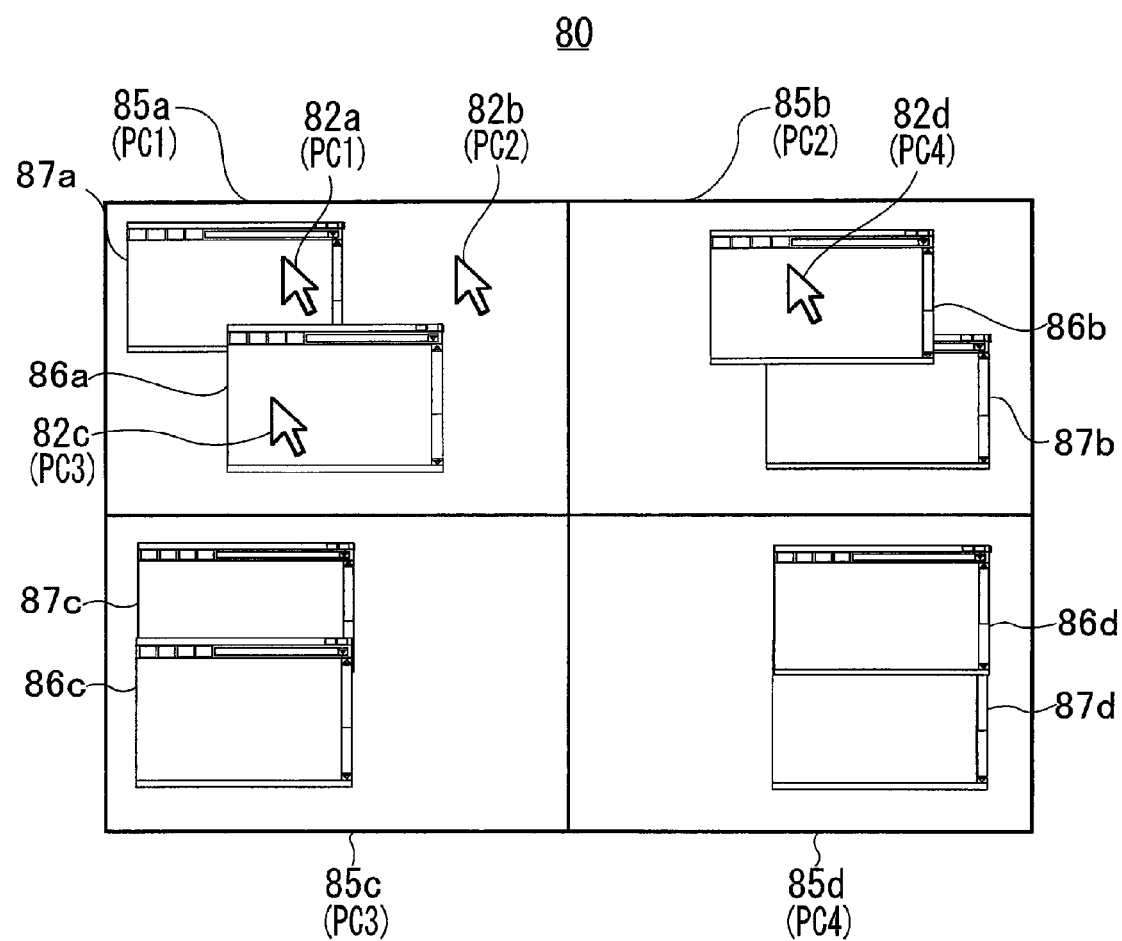
FIG. 11 illustrates an additional example display image according to one or more aspects described herein.
Figure 12:
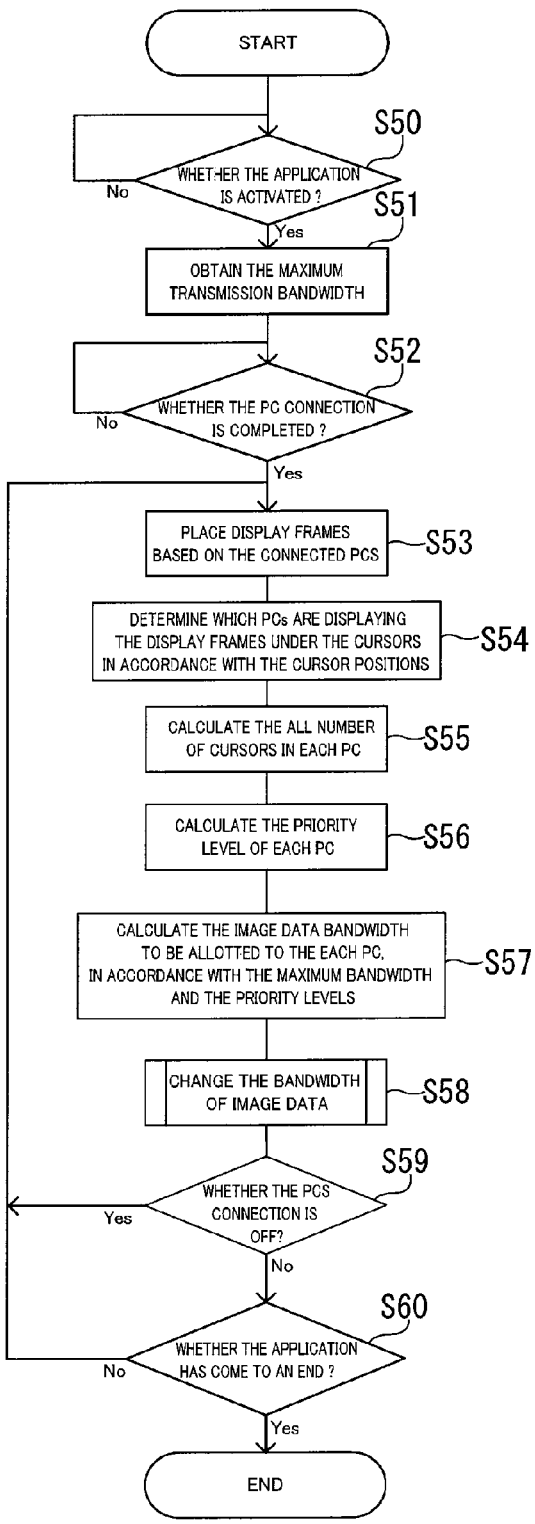
FIG. 12 illustrates an example flowchart of an operation to be performed in a second embodiment according to one or more aspects described herein.

Next, a second embodiment is described. In the second embodiment, the cursors 82*a* through 82*d* of the respective computer devices 50*a* through 50*d* are displayed in the display image 80, as shown in FIG. 11. FIG. 12 is a flowchart of an operation in accordance with the second embodiment, which is described below.

According to the flowchart of FIG. 12, when the image display device 1 is activated, the application software stored in the control software storage area 34b is activated, and the operation moves from the processing of step S50 to determine "whether the application is activated?" on to the processing of step S51 to "obtain the maximum transmission bandwidth".

As described above, the "maximum transmission bandwidth" is set beforehand in the image display device 1, depending on the type of the interface of the network connecting unit 10. In step S51, the microcomputer 33 of the image display device 1 identifies the type of the interface of the network connecting unit 10 having the computer devices 50 connected thereto, and obtains the "maximum transmission bandwidth". When this processing is completed, the operation moves on to the processing of step S52 to determine "whether the PC connection is completed".

In the determining processing of step S52, a determination is made as to whether the connection with the computer devices 50a through 50d via the communication means 60 is completed. If the connection with the computer devices 50 is determined to be completed, the operation moves onto the processing of step S53 to "place display frames based on the connected PCs".

In the processing of step S53, the number of connected computer devices 50 is counted, and the image arranging means 32 designates the regions of the display frames 85 in the display image 80 in accordance with the number of connected computer devices 50. Based on the "image data" transmitted from the computer devices 50, the image arranging means 32 generates the display frames 85 to be displayed on the respective computer devices 50, and arrange the display frames 85 on the display image 80 in a non-overlapping manner. In a case where the four computer devices 50a through 50d are connected to the image display device 1 via the communication means 60, as in this embodiment, the image arranging means 32 designates the regions of the display frames 85a through 85d formed by dividing the display image 80 by four, two in the transverse direction and two in the vertical direction. The image arranging means 32 then generates the display frames 85a through 85d to be displayed on the computer devices 50a through 50d, and arrange the display frames 85a through 85d in the designated regions in a non-overlapping manner.

As shown in FIG. 11, the window regions 86a through 86d and 87a through 87d shown on the computer devices 50a through 50d are displayed in the display frames 85a through 85d.

In the second embodiment, the cursor arranging means 31 places the cursors 82a through 82d in the display frame 80, in accordance with the "cursor position information data" transmitted from the computer devices 50a through 50d. The operators of the computer devices 50a through 50d can handle the cursors 82a through 82d across the display frames 85a through 85d. After this processing is ended, the operation moves on to the processing of step S54 to "determine which PCs are displaying the display frames under the cursors in accordance with the cursor positions".

In the processing of step S54, the bandwidth calculating means 39 makes a determination on the computer devices 50a through 50d displaying the display frames 85a through 85d, in accordance with the positions of the cursors 82 displayed on the display image 80. After the processing of step S54 is ended, the operation moves on to the processing of step S55 to "calculate the all number of cursors in each PC".

In the processing of step S55, the bandwidth calculating means 39 adds up the cursors 82a through 82d existing in the display frames 85a through 85d displayed on the respective computer devices 50a through 50d, so as to calculate the "all number of cursors in each computer". After this processing is completed, the operation moves on to the processing of step S56 to "calculate the priority level of each PC".

In the processing of step S56, the bandwidth calculating means 39 adds a predetermined numeric value (such as 1) to the "all number of cursors of each computer" calculated in step S55, so as to calculate the "priority level" of each of the computer devices 50a through 50d. After this operation is completed, the operation moves on to the processing of step S57 to "calculate the image data bandwidth to be allotted to the each PC, in accordance with the maximum bandwidth and the priority levels".

In the processing of step S57, the bandwidth calculating means 39 subtracts the "bandwidth of the cursor position information data" from the "maximum transmission bandwidth" obtained in the processing of step S51, so as to calculate the "maximum bandwidth of image data" to be used by the computer devices 50a through 50d to transmit the "image data" to the image display device 1. The bandwidth calculating means 39 calculates the "image data bandwidth" of each of the computer devices 50a through 50d by dividing the "maximum bandwidth of image data" by the numeric value obtained by adding up all the "priority levels" obtained in the processing of step S56, and then multiplying the resultant value by the "priority level" of each of the computer devices 50a through 50d. The operation then moves on to the processing of step S58 to "change the bandwidth of image data". In step S58, the "image data bandwidth" of the computer devices 50a through 50d are processed to be changed.

Table 7 shows the calculation results of the processing of steps S57 and S58 obtained in a case where the "predetermined priority level" and the "predetermined numeric value" are both 1, and the "maximum bandwidth of image data" is 100 Mbps.

TABLE 7

| Computer device | Number of cursors in display frame | Priority level | Image data bandwidth |
| --- | --- | --- | --- |
| 50a | 3 | 4 | 50 Mbps |
| 50b | 1 | 2 | 25 Mbps |
| 50c | 0 | 1 | 12.5 Mbps |
| 50d | 0 | 1 | 12.5 Mbps |
| total | 0 | 8 | 100 Mbps |

In the processing of step S58, after the bandwidth calculating means 39 changes the "image data bandwidth" of the computer devices 50a through 50d, the transmission amount control means 40 transmits the "image data bandwidth" to the computer devices 50a through 50d in accordance with the flowchart shown in FIG. 8. In this manner, the transmission amount control means 40 controls the "transmission amount of image data" of the computer devices 50a through 50d.

When the processing of step S58 is ended, the operation moves on to the processing of step S59 to determine "Whether the PCs connection is off?". If the communication between the image display device 1 and any of the computer devices 50a through 50d is determined to be off in the determining processing of step S59, the operation returns to the processing of step S53.

On the other hand, in the determining processing of step S59, if the communication between the image display device 1 and any of the computer devices 50a through 50d is determined not to be off, the operation moves on to the processing of step S60 to determine "whether the application has come to an end?".

In the determining processing of step S60, if the application software controlling the image display device 1 has come to an end, the series of processing comes to an end.

On the other hand, in the determining processing of step S60, if the application software controlling the image display device 1 has not come to an end, the operation returns to the processing of step S53.

As described above, the "image data bandwidth" of the computer device 50a displaying the display frame 85a that has the large number (three in FIG. 11) of cursors 82 located therein and is drawing the attention of the operators and the participants of a meeting or the like is made higher than the "image data bandwidth" of any of the other computer devices 50b, 50c, and 50d. In this manner, the frame rate of the display frame 85a displayed on the display image 80 becomes higher, and the display frame 85a can be made easier to see.

Figure 13:
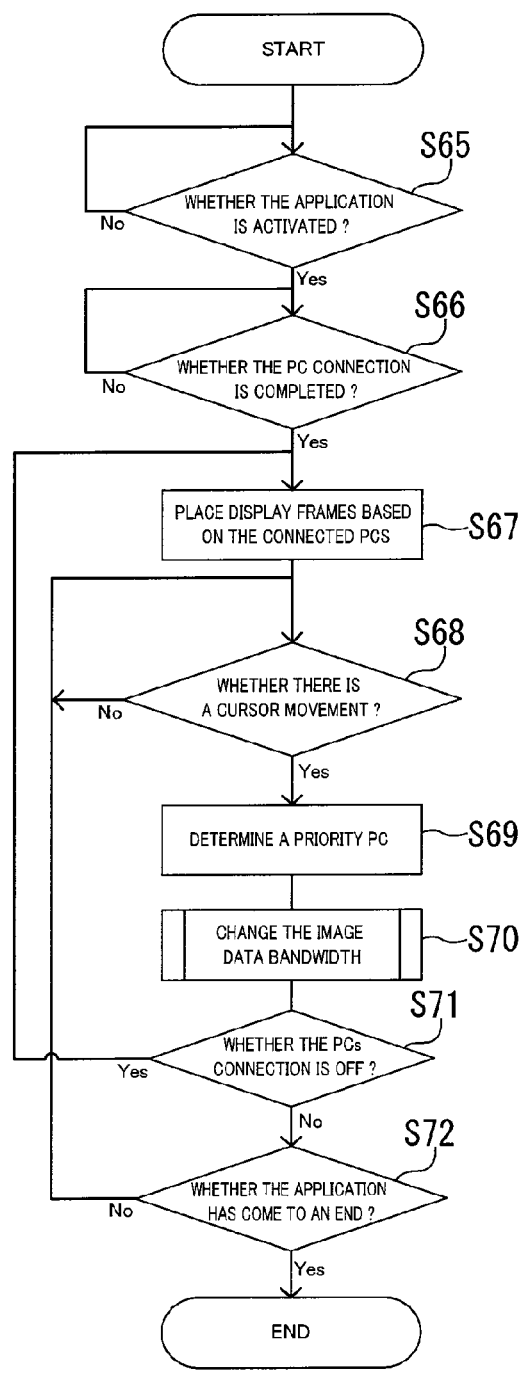
FIG. 13 illustrates an example flowchart of an operation to be performed in a third embodiment according to one or more aspects described herein.

Next, a third embodiment is described. In the third embodiment, the cursors 82a through 82d of the computer devices 50a through 50d are also displayed in the display image 80, as shown in FIG. 11. FIG. 13 is a flowchart of an operation in accordance with the third embodiment, which is described below.

According to the flowchart of FIG. 13, when the image display device 1 is activated, the application software stored in the control software storage area 34b is activated, and the operation moves from the processing of step S65 to determine "whether the application is activated?" on to the processing of step S66 to determine "whether the PC connection is completed?".

In the determining processing of step S66, a determination is made as to whether the connection with the computer devices 50a through 50d via the communication means 60 is completed. If the connection with the computer devices 50 is determined to be completed, the operation moves onto the processing of step S67 to "place display frames based on the connected PCs".

In the processing of step S67, the number of connected computer devices 50 is counted, and the image arranging means 32 designates the regions of the display frames 85 in the display image 80 in accordance with the number of connected computer devices 50. Based on the "image data" transmitted from the connected computer devices 50, the image arranging means 32 generates the display frames 85 to be displayed on the respective computer devices 50, and arrange the display frames 85 on the display image 80 in a non-overlapping manner. In a case where the four computer devices 50a through 50d are connected to the image display device 1 via the communication means 60, as in this embodiment, the image arranging means 32 designates the regions of the display frames 85a through 85d formed by dividing the display image 80 by four, two in the transverse direction and two in the vertical direction. The image arranging means 32 then generates the display frames 85a through 85d to be displayed on the computer devices 50a through 50d, and arrange the display frames 85a through 85d in the designated regions in a non-overlapping manner.

As shown in FIG. 11, the window regions 86a through 86d and 87a through 87d shown on the computer devices 50a through 50d are displayed in the display frames 85a through 85d.

In the third embodiment, the cursor arranging means 31 also places the cursors 82a through 82d in the display image 80, in accordance with the "cursor position information data" transmitted from the respective computer devices 50a through 50d, as in the second embodiment. The operators of the computer devices 50a through 50d can handle the cursors 82a through 82d across the display frames 85a through 85d. After this processing of step S67 is ended, the operation moves on to the processing of step S68 to determine "whether there is a cursor movement?"

In the determining processing of step S68, the bandwidth calculating means 39 determines whether the cursors 82 displayed on the display image 80 have moved. If the cursors 82 are determined to have moved, the operation moves on to the processing of step S69 to "determine a priority PC".

In the processing of step S69, the bandwidth calculating means 39 determines which one of the computer devices 50a through 50d is transmitting the "cursor position information data" of the last moved cursor 82. After the processing of step S69 is ended, the operation moves on to the processing of step S70 to "change the image data bandwidth".

In the processing of step S70, the bandwidth calculating means 39 increases the "image data bandwidth" of the one of the computer devices 50a through 50d determined in the processing of step S69. Since the "maximum bandwidth of image data" used for transmitting the "image data" is fixed, the "image data bandwidth" of the other ones of the computer devices 50a through 50d other than the one determined in the processing of step S69 become smaller through this processing.

In the processing of step S70, after the bandwidth calculating means 39 changes the "image data bandwidth" of the computer devices 50a through 50d, the transmission amount control means 40 transmits the "image data bandwidth" to the computer devices 50a through 50d in accordance with the flowchart shown in FIG. 8. In this manner, the transmission amount control means 40 controls the "transmission amount of image data" of the computer devices 50a through 50d.

When the processing of step S70 is ended, the operation moves on to the processing of step S71 to determine "Whether the PCs connection is off?". If the communication between the image display device 1 and any of the computer devices 50a through 50d is determined to be off in the determining processing of step S71, the operation returns to the processing of step S67.

On the other hand, in the determining processing of step S71, if the communication between the image display device 1 and any of the computer devices 50a through 50d is determined not to be off, the operation moves on to the processing of step S72 to determine "whether the application has come to an end?".

In the determining processing of step S72, if the application software controlling the image display device 1 has not come to an end, the series of processing comes to an end.

On the other hand, in the determining processing of step S72 if the application software controlling the image display device 1 has not come to an end, the operation returns to the determining processing of step S68.

In the processing of step S69 of the third embodiment, the bandwidth calculating means 39 may determine which one of the computer devices 50a through 50d is transmitting the "image data" of the one of the display frames 85a through 85d containing the last moved one of the cursors 82a through 82d. In the processing of step S70, the bandwidth calculating means 39 may increase the "image data bandwidth" of the determined one of the computer devices 50a through 50d. Since the "maximum bandwidth of image data" is fixed, the "image data bandwidth" of the other ones of the computer devices 50a through 50d other than the one determined in the processing of step S69 become lower through this processing.

Alternatively, in the processing of step S69, the bandwidth calculating means 39 may determine which one of the computer devices 50a through 50d is transmitting the "cursor position information data" of the last moved one of the cursors 82a through 82d, and determine which one of the computer devices 50a through 50d is transmitting the "image data" of the one of the display frames 85a through 85d containing the last moved one of the cursors 82a through 82d. In the processing of step S70, the bandwidth calculating means 39 may increase the "image data bandwidth" of the detected ones of the computer devices 50a through 50d.

Figure 14:
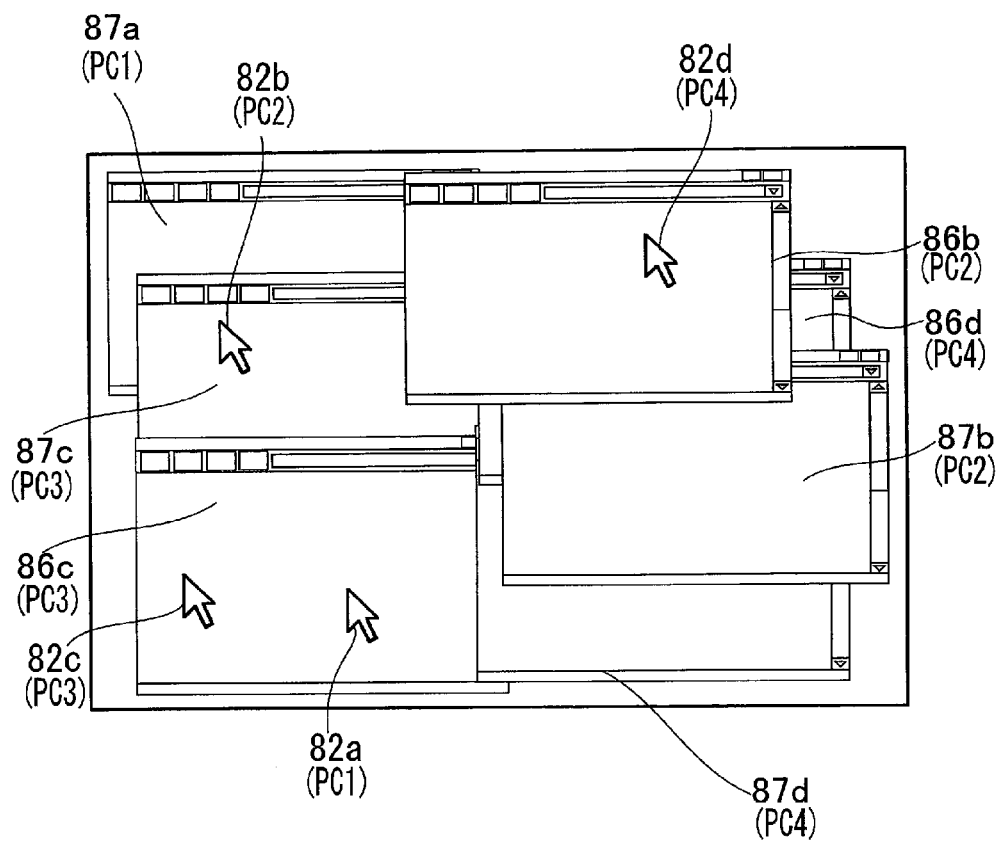
FIG. 14 illustrates an example display image of a fourth embodiment according to one or more aspects described herein.
Figure 15:
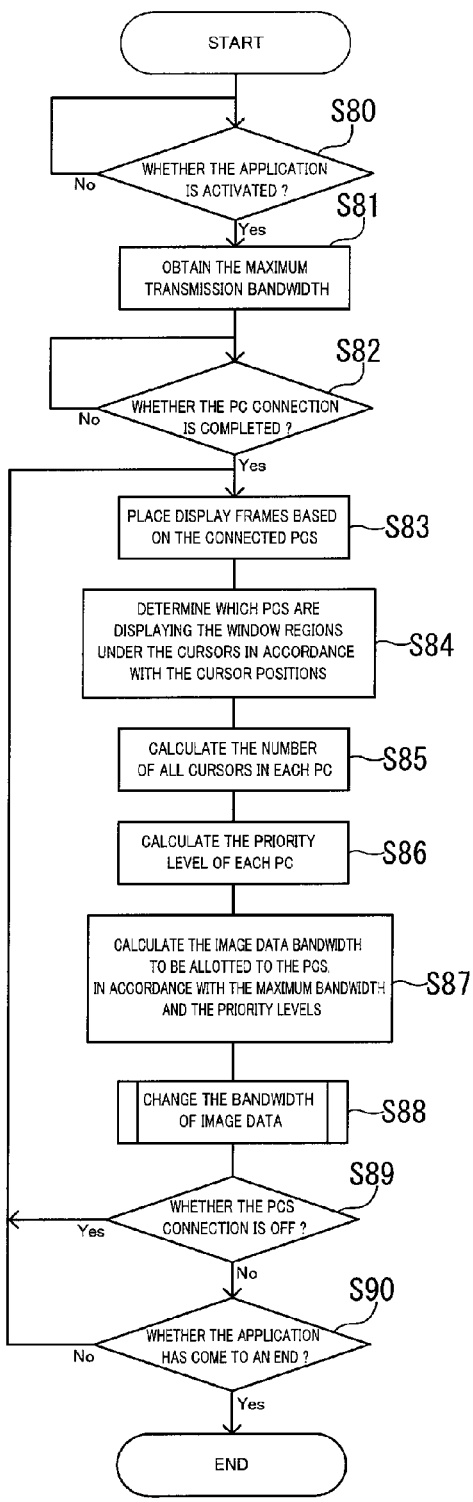
FIG. 15 illustrates an example flowchart of an operation to be performed in the fourth embodiment according to one or more aspects described herein.

Next, a fourth embodiment is described. As shown in FIG. 14, on the display image 81 of the fourth embodiment, the display frames 85a through 85d and the cursors 82a through 82d to be displayed on the computer devices 50a through 50d are placed in one region in a synthetically overlapping manner, as shown in FIG. 14. FIG. 15 is a flowchart of an operation in accordance with the fourth embodiment, which is described below.

According to the flowchart of FIG. 15, when the image display device 1 is activated, the application software stored in the control software storage area 34b is activated, and the operation moves from the processing of step S80 to determine "whether the application is activated?" on to the processing of step S81 to "obtain the maximum transmission bandwidth".

In step S81, the interface of the network connected unit 10 having the computer devices 50 connected thereto is identified, and the "maximum transmission bandwidth" is obtained. When this processing is completed, the operation moves on to the processing of step S82 to determine "whether the PC connection is completed?".

In the determining processing of step S82, a determination is made as to whether the connection with the computer devices 50a through 50d via the communication means 60 is completed. If the connection with the computer devices 50 is determined to be completed, the operation moves on to the processing of step S83 to "place display frames based on the connected PCs".

In the processing of step S83, the image arranging means 32 generates the display frames 85a through 85d to be displayed on the respective computer devices 50a through 50d, based on the "image data" transmitted from the connected computer devices 50. The image arranging means 32 then places the display frames 85a through 85d on the display image 81 in a synthetically overlapping manner.

As shown in FIG. 14, the window regions 86a through 86d and 87a through 87d shown on the computer devices 50a through 50d are displayed on the display image 81.

The cursor arranging means 31 places the cursors 82a through 82d in the display image 81, in accordance with the "cursor position information data" transmitted from the computer devices 50a through 50d. The operators of the computer devices 50a through 50d can handle the cursors 82a through 82d displayed in the display image 81. After this processing is ended, the operation moves on to the processing of step S84 to "determine which PCs are displaying the window regions under the cursors in accordance with the cursor positions".

In the processing of step S84, the bandwidth calculating means 39 makes a determination on the computer devices 50a through 50d displaying the window regions 86a through 86d and 87a through 87d, in accordance with the positions of the cursors 82 displayed on the display image 81.

After the processing of step S84 is ended, the operation moves on to the processing of step S85 to "calculate the number of all cursors in each PC".

In the processing of step S85, the bandwidth calculating means 39 adds up the cursors 82a through 82d existing in the window regions 86a through 86d and 87a through 87d displayed on the computer devices 50a through 50d, so as to calculate the "number of cursors in each computer device". After this processing of S85 is completed, the operation moves on to the processing of step S86 to "calculate the priority level of each PC".

In the processing of step S86, the bandwidth calculating means 39 adds a predetermined numeric value (such as 1) to the "number of all cursors of each computer" calculated in step S85, so as to calculate the "priority level" of each of the computer devices 50a through 50d. After this processing is completed, the operation moves on to the processing of step S87 to "calculate the image data bandwidth to be allotted to the PCs, in accordance with the maximum bandwidth and the priority levels".

In the processing of step S87, the bandwidth calculating means 39 subtracts the "bandwidth of the cursor position information data" from the "maximum transmission bandwidth" determined in the processing of step S81, so as to calculate the "maximum bandwidth of image data" to be used by the computer devices 50a through 50d to transmit the "image data" to the image display device 1. The bandwidth calculating means 39 calculates the "image data bandwidth" of each of the computer devices 50a through 50d by dividing the "maximum bandwidth of image data" by the numeric value obtained by adding up all the "priority levels" determined in the processing of step S86, and then multiplying the resultant value by the "priority level" of each of the computer devices 50a through 50d. The operation then moves on to the processing of step S88 to "change the bandwidth of image data". In step S88, the "image data bandwidth" of the computer devices 50a through 50d are changed.

Table 8 shows the calculation results of the processing of steps S87 and S88 obtained in a case where the "predetermined priority level" and the "predetermined numeric value" are both 1, and the "maximum bandwidth of image data" is 100 Mbps.

TABLE 8

| Computer device | Number of cursors in window region | Priority level | Image data bandwidth |
|---|---|---|---|
| 50a | 0 | 1 | 12.5 Mbps |
| 50b | 1 | 2 | 25 Mbps |
| 50c | 3 | 4 | 50 Mbps |
| 50d | 0 | 1 | 12.5 Mbps |
| total | 0 | 8 | 100 Mbps |

In the processing of step S88, after the bandwidth calculating means 39 changes the "image data bandwidth" of the computer devices 50a through 50d, the transmission amount control means 40 transmits the "image data bandwidth" to the computer devices 50a through 50d in accordance with the flowchart shown in FIG. 8. In this manner, the transmission amount control means 40 controls the "transmission amount of image data" of the computer devices 50a through 50d.

When the processing of step S88 is ended, the operation moves on to the processing of step S89 to determine "Whether the PCs connection is off?". If the communication between the image display device 1 and any of the computer devices 50a through 50d is determined to be off in the determining processing of step S89, the operation returns to the processing of step S83.

On the other hand, in the determining processing of step S89, if the communication between the image display device 1 and any of the computer devices 50a through 50d is determined not to be off, the operation moves on to the processing of step S90 to determine "whether the application has come to an end?".

In the determining processing of step S90, if the application software controlling the image display device 1 has come to an end, the series of processing comes to an end.

In the determining processing of step S90. If the application software controlling the image display device 1 has not come to an end, the operation returns to the processing of step S83.

As described above, the "image data bandwidth" of the computer device 50c displaying the window region 86c and 87c that have the large number (three in FIG. 14) of cursors 82 located therein and is drawing the attention of the operators and the participants of a meeting or the like is made higher than the "image data bandwidth" of any of the other computer devices 50a, 50b, and 50d. In this manner, the frame rate of the display frame 85c displayed on the display image 81 becomes higher, and the window region 86c and the window region 87c can be made easier to see.

Figure 16:
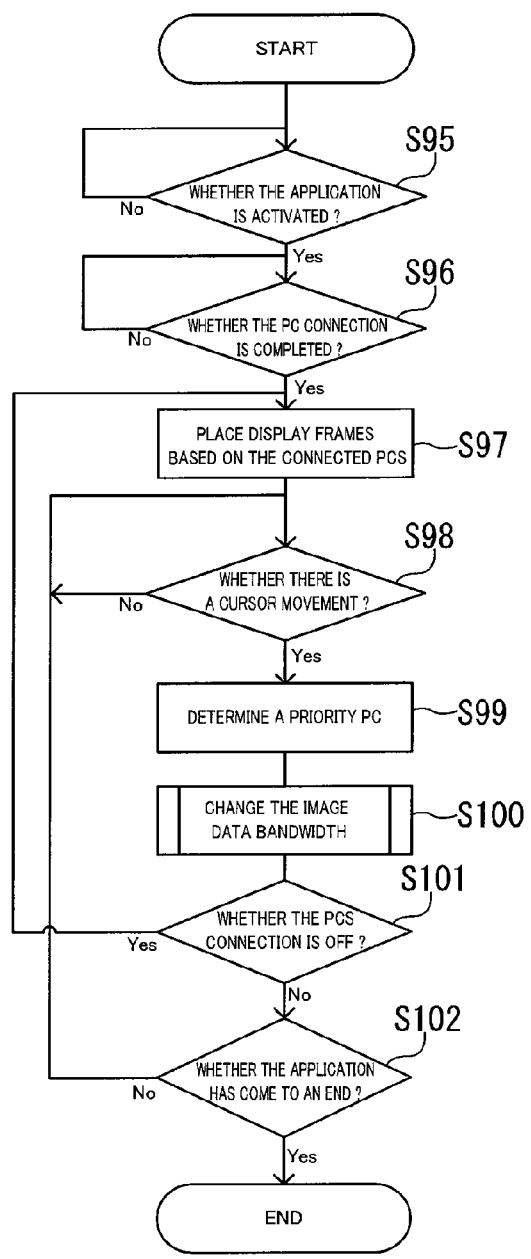
FIG. 16 illustrates an example flowchart of an operation to be performed in a fifth embodiment according to one or more aspects described herein.

Next, a fifth embodiment is described. As shown in FIG. 14, on the display image 81 of the fifth embodiment, the display frames 85a through 85d and the cursors 82a through 82d to be displayed on the computer devices 50a through 50d are also placed in one region in a synthetically overlapping manner. FIG. 16 is a flowchart of an operation in accordance with the fifth embodiment, which is described below.

According to the flowchart of FIG. 16, when the image display device 1 is activated, the application software stored in the control software storage area 34b is activated, and the operation moves from the processing of step S95 to determine "whether the application is activated?" on to the processing of step S96 to determine "whether the PC connection is completed?".

In the determining processing of step S86, a determination is made as to whether the connection with the computer devices 50a through 50d via the communication means 60 is completed. If the connection with the computer devices 50 is determined to be completed, the operation moves on to the processing of step S97 to "place display frames based on the connected PCs".

In the processing of step S97, based on the "image data" transmitted from the connected computer devices 50, the image arranging means 32 generates the display frames 85a through 85d to be displayed on the respective computer devices 50a through 50d, and arrange the display frames 85a through 85d on the display image 81 in a synthetically overlapping manner.

As shown in FIG. 14, the window regions 86a through 86d and 87a through 87d shown on the computer devices 50a through 50d are displayed on the display image 81.

The cursor arranging means 31 places the cursors 82a through 82d in the display image 81, in accordance with the "cursor position information data" transmitted from the computer devices 50a through 50d. The operators of the computer devices 50a through 50d can handle the cursors 82a through 82d displayed on the display image 81. After this processing is ended, the operation moves on to the processing of step S98 to determine "whether there is a cursor movement?".

In the determining processing of step S98, the bandwidth calculating means 39 determines whether the cursors 82 displayed on the display image 81 have moved. If the cursors 82 are determined to have moved, the operation moves on to the processing of step S99 to "determine a priority PC".

In the processing of step S99, the bandwidth calculating means 39 determines which one of the computer devices 50a through 50d is transmitting the "cursor position information data" of the last moved cursor 82. After the processing of step S99 is ended, the operation moves on to the processing of step S100 to "change the image data bandwidth".

In the processing of step S100, the bandwidth calculating means 39 increases the "image data bandwidth" of the one of the computer devices 50a through 50d determined in the processing of step S99. Since the "maximum bandwidth of image data" used for transmitting the "image data" is fixed, the "image data bandwidth" of the other ones of the computer devices 50a through 50d other than the one determined in the processing of step S99 become smaller through this processing.

After the bandwidth calculating means 39 changes the "image data bandwidth" of the computer devices 50a through 50d in the processing of step S100, the transmission amount control means 40 transmits the "image data bandwidth" to the computer devices 50a through 50d in accordance with the flowchart shown in FIG. 8. In this manner, the transmission amount control means 40 controls the "transmission amount of image data" of the computer devices 50a through 50d.

When the processing of step S100 is ended, the operation moves on to the processing of step S101 to determine "Whether the PCs connection is off?". If the communication between the image display device 1 and any of the computer devices 50a through 50d is determined to be off, the operation returns to the processing of step S97.

On the other hand, in the determining processing of step S101, if the communication between the image display device 1 and any of the computer devices 50a through 50d is determined not to be off, the operation moves on to the processing of step S102 to determine "whether the application has come to an end?".

In the determining processing of step S102, if the application software controlling the image display device 1 has come to an end, the series of processing comes to an end.

On the other hand, in the determining processing of step S102, if the application software controlling the image display device 1 has not come to an end, the operation returns to the processing of step S98.

In the processing of step S99 of the fifth embodiment, the bandwidth calculating means 39 may identify which one of the computer devices 50a through 50d is transmitting the "image data" of the one of the window regions 86a through 86d and 87a through 87d containing the last moved one of the cursors 82a through 82d. In the processing of step S100, the bandwidth calculating means 39 may increase the "image data bandwidth" of the detected one of the computer devices 50a through 50d. Since the "maximum bandwidth of image data" is fixed, the "image data bandwidth" of the other ones of the computer devices 50a through 50d other than the one determined in the processing of step S99 become lower through this processing.

Alternatively, in the processing of step S99, the bandwidth calculating means 39 may determine which one of the computer devices 50a through 50d is transmitting the "cursor position information data" of the last moved one of the cursors 82a through 82d, and determine which one of the computer devices 50a through 50d is transmitting the image data of the one of the window regions 86a through 86d and 87a through 87d containing the last moved one of the cursors 82a through 82d. In the processing of step S100, the bandwidth calculating means 39 may increase the "image data bandwidth" of the detected ones of the computer devices 50a through 50d.

Figure 17:
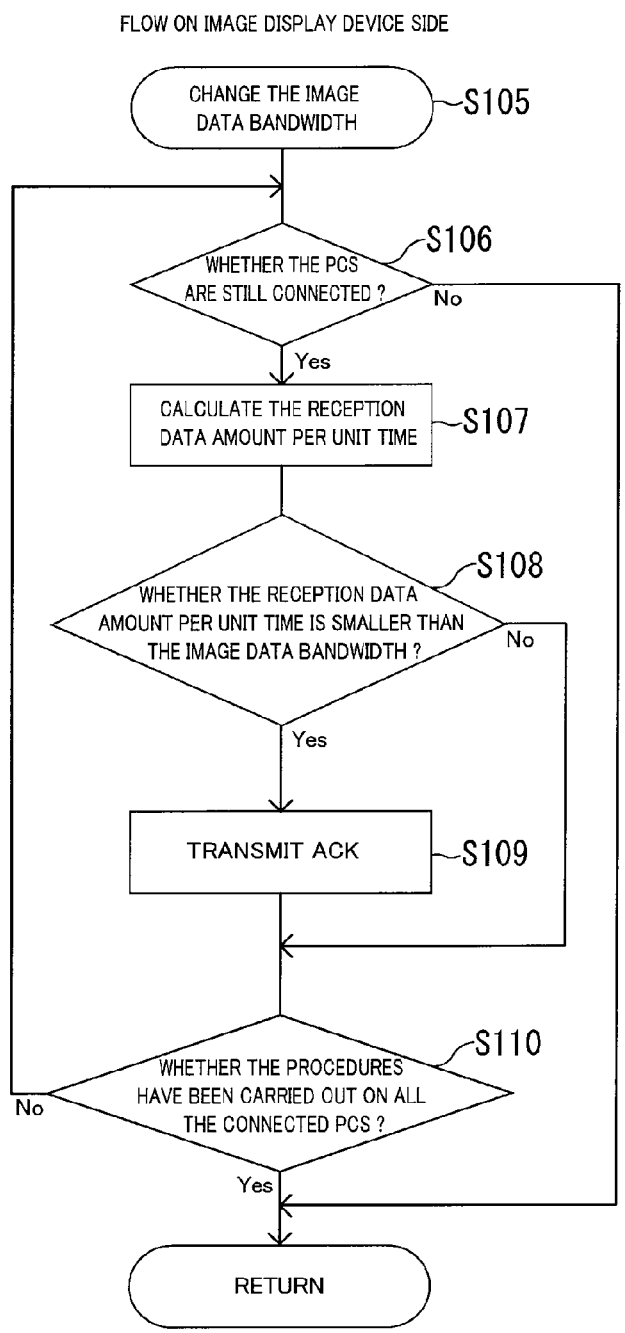
FIG. 17 illustrates an example flowchart of an operation to be performed in a sixth embodiment according to one or more aspects described herein.

FIG. 17 is a flowchart of an operation in accordance with a sixth embodiment that is described in the following. In the sixth embodiment, the same procedures as those of the first through fifth embodiments are carried out up to the processing of step S18, S58, S70, S88, and S100 of the first through fifth embodiments. In the first through fifth embodiments, after the processing of S18, S58, S70, S88, and S100 is carried out, the transmission amount control means 40 transmits the "image data bandwidth" of the computer devices 50a through 50d to the computer devices 50a through 50d, so as to control the "transmission amount of image data" of the computer devices 50a through 50d, as shown in FIG. 8. In the sixth embodiment, on the other hand, "image data" is transmitted through communication procedures involving a flow control operation. The transmission amount control means 40 controls a "reception confirmation signal" or a "next transmission request signal" to be transmitted to the computer devices 50a through 50d. In this manner, the transmission amount control means 40 controls the transmission amount of the "image data" of the computer devices 50a through 50d.

The following is a description of a flow control operation to transmit ACK (Acknowledgment) as an example of the "reception confirmation signal" to be transmitted from the image display device 1 to the computer devices 50a through 50d in a case where the "image data" is transmitted to the image display device 1 by using TCP protocols.

In the processing of S18, S58, S70, S88, and S100, the bandwidth calculating means 39 changes the "image data bandwidth" of the computer devices 50a through 50d. The operation then moves from the processing of step S105 to "change the image data bandwidth" on to the processing of step S106 to determine "whether the PCs are still connected?". In the processing of step S106 to determine "whether the PCs are still connected", a determination is made as to whether the computer devices 50a through 50d are still connected to the image display device 1 via the communication means 60.

In the determining processing of step S106, if the computer devices 50 are determined to be still connected to the image display device 1, the operation moves onto the processing of step S107 to "calculate the reception data amount per unit time".

On the other hand, in the determining processing of step S106, if the computer devices 50 are determined not to be still connected to the image display device 1, the operation returns to the processing of step S105.

In the processing of step S107, the "image data" that is transmitted from the computers and received by the receiving unit 10a is stored in the memory device 34 with a FIFO (First In, First Out) buffer. The data amount of the stored "image data" is divided by a "predetermined time", so as to calculate the "reception data amount per unit time". After the processing of step S107 is ended, the operation moves on to the processing of step S108 to determine "whether the reception data amount per unit time is smaller than the image data bandwidth?".

In the determining processing of step S108, the transmission amount control means 40 determines whether the "reception data amount per unit time" calculated in step S107 is smaller than the "image data bandwidth". The transmission amount control means 40 then carries out the processing of step S109 to "transmit ACK" to the one of the computer devices 50a through 50d determined to have the "reception data amount per unit time" smaller than the "image data bandwidth".

In the processing of step S109, the transmission amount control means 40 transmits ACK to the one of the computer devices 50a through 50d determined to have the "reception data amount per unit time" smaller than the "image data bandwidth" in the processing of step S108. Here, ACK is an ACK signal (a confirmation response) to be transmitted to the computer devices 50a through 50d after the connection between the image display device 1 and each of the computer devices 50a through 50d is established. The one of the computer devices 50a through 50d having received ACK transmits the "image data" to the image display device 1. The computer devices 50a through 50d divide the "image data" into "segments" of MSS (Maximum Segment Size, which is the maximum segment length in TCP) that is set when the connection is established. When the computer devices 50a through 50d receive the ACK, the corresponding "segment" is transmitted to the image display device 1.

In a case where the communications between the image display device 1 and each of the computer devices 50a through 50d are window-controlled, and the transmission amount control means 40 transmits ACK signals to one of the computer devices 50a through 50d, the one of the computer devices 50a through 50d receiving the ACK signals may transmit the image data of reception window size (RWIN) to the image display device 1. After the processing of step S109 is ended, the operation moves on to the processing of step S110 to determine "whether the procedures have been carried out on all the connected PCs?".

On the other hand, in the processing of step S109, if the transmission amount control means 40 determines that the "reception data amount per unit time" calculated in step S108 is larger than the "image data bandwidth", ACK signals are not transmitted to the subject one of the computer devices 50a through 50d, and the operation moves on to the determining processing of step S110. In other words, in a case where the "reception data amount per unit time" of one of the computer devices 50a through 50d is larger than the "image data bandwidth", the determining processing of step S108 is not carried out on the one of the computer devices 50a through 50d before the determining processing of step S108 is carried out on all the other ones of the computer devices 50a through 50d. Also, ACK signals are not transmitted to the one of the computer devices 50a through 50d before the "reception data amount per unit time" of the one of the computer devices 50a through 50d becomes smaller than the "image data bandwidth".

In the determining processing of step S110, if the processing of steps S106 through S110 are determined not to have been carried out on all the computer devices 50a through 50d connected to the image display device 1, the processing of step S106 is carried out on the subject one of the computer devices 50a through 50d. In this manner, the processing of steps S106 through S110 are sequentially carried out on each of the computer devices 50a through 50d. In the determining processing of step S110, if the processing of steps S106 through S110 are determined to have been carried out on all the computer devices 50a through 50d connected to the image display device 1, the operation returns to step S105.

The communication processing involving a flow control operation to transmit the "image data" from the computer devices 50a through 50d to the image display device 1 are not limited to TCP. Also, the transmission amount control means 40 may not transmit the "reception confirmation signal" to the computer devices 50a through 50d, but may transmit the "next transmission request signal" so as to control the "image data transmission amount" of each of the computer devices 50a through 50d.

The transmission amount control means 40 may control the time interval between the reception of "image data" and the transmission of the "reception confirmation signal" or "next transmission request signal", in accordance with the "image data bandwidth" of each of the computer devices 50a through 50d. In this manner, the transmission amount control means 40 may control the "image data transmission amount" of each of the computer devices 50a through 50d.

Figure 18:
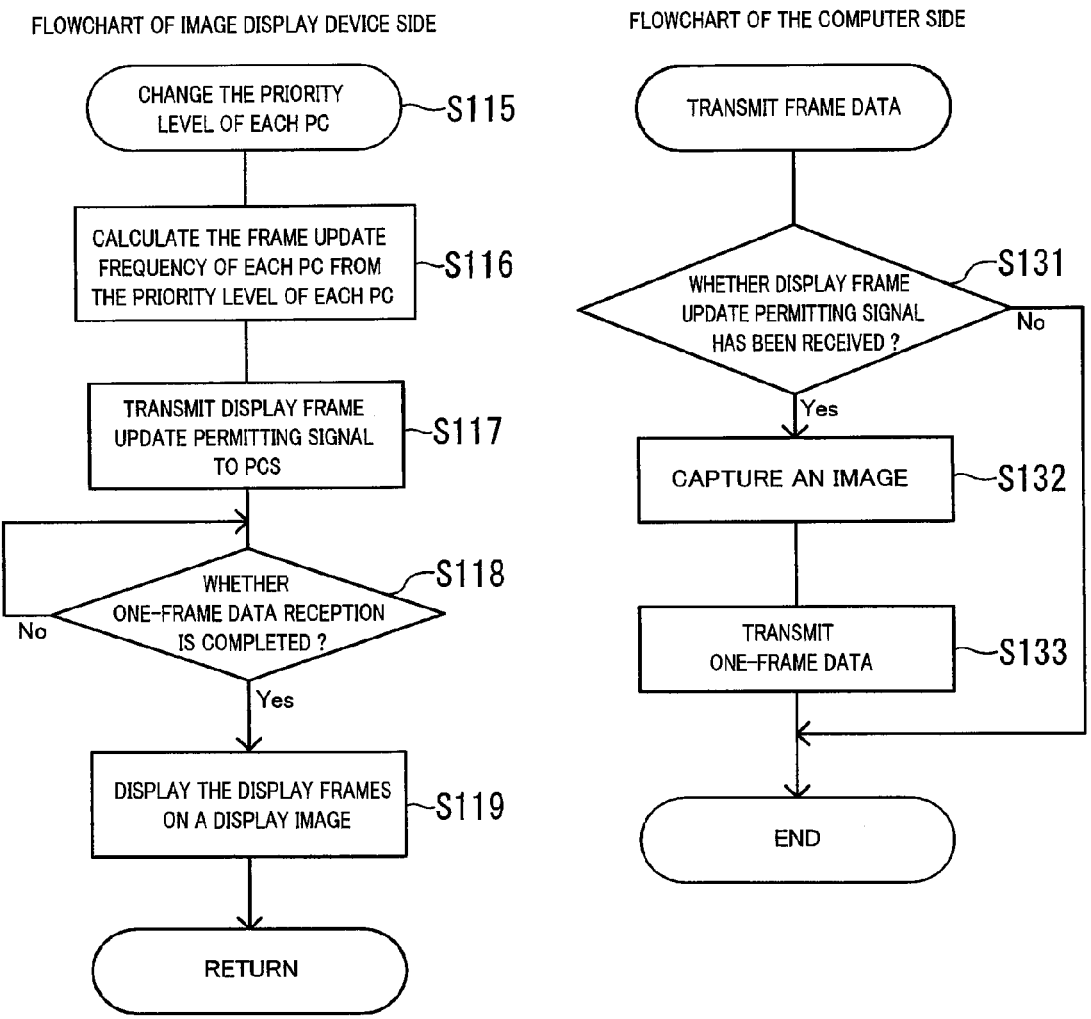
FIG. 18 illustrates an example flowchart of an operation to be performed in a seventh embodiment according to one or more aspects described herein.

FIG. 18 shows flowcharts of operations in accordance with a seventh embodiment that is described in the following. The seventh embodiment is the same as the first embodiment, the second embodiment, and the third embodiment, up to the processing in which the bandwidth calculating means 39 of each of the first, second, and third embodiments changes the "priority level" of each of the computer devices 50a through 50d. In the first, second, and third embodiments, after changing the "priority level" of each of the computer devices 50a through 50d, the calculating unit 39 changes the "image data bandwidth" of each of the computer devices 50a through 50d. The transmission amount control means 40 then transmits the "image data bandwidth" of the computer devices 50a through 50d to the computer devices 50a through 50d, so as to control the "image data transmission amount" of each of the computer devices 50a through 50d in accordance with the flowchart shown in FIG. 8. In the seventh embodiment, on the other hand, the bandwidth calculating means 39 calculates the update rate of each of the display frames 85a through 85d of the computer devices 50a through 50d, in accordance with the "priority levels" calculated in the first, second, and third embodiments. Based on the update rate, the transmission amount control means 40 transmits a signal to allow transmission of the display frames 85a through 85d to each of the computer devices 50a through 50d. In this manner, the transmission amount control means 40 controls the "image data transmission amount" of each of the computer devices 50a through 50d.

In a case where the bandwidth calculating means 39 changes the "priority level" of each of the computer devices 50a through 50d, the operation moves from the processing of step S115 to "change the priority level of each PC" on to the processing of step S116 to "calculate the frame update frequency of each PC from the priority level of each PC".

In the processing of step S116, the bandwidth calculating means 39 calculates the update frequency of each of the display frames 85a through 85d of the computer devices 50a through 50d. After the processing of step S116 is completed, the operation moves on to the processing of step S117 to "transmit display frame update permitting signal to PCs".

In the processing of step S117, the transmission amount control means 40 transmits a "display frame update permitting signal" to each of the computer devices 50a through 50d, so as to allow transmission of only one frame of the display frames 85a through 85d to the image display device 1, in accordance with the update frequency of each of the display frames 85a through 85d of the computer devices 50a through 50d calculated in step S116. After the processing of step S117 is completed, the operation moves on to the processing of step S118 to determine "Whether one-frame data reception is completed?".

On the other hand, in step S131, after the "Whether display frame update permitting signal has been received?", the computer devices 50a through 50d receiving the "display frame update permitting signal" move on to the processing of step S132 to "capture an image". The "image data" of the display frame 85a displayed on the computer devices 50a through 50d is captured. After the processing of step S132 is completed, the operation moves on to the processing of step S133 to "transmit one-frame data".

In the processing of step S133, the computer devices 50a through 50d transmits "one-frame data" that is the data of the one frame of the display frames 85a through 85d captured in the processing of step S132.

In the processing of step S118, in a case where the receiving unit 10a receives "one-frame data" (the display frames 85a through 85d) that are transmitted from the computer devices 50a through 50d in the processing of step S133, the operation moves on to the processing of step S119 to "display the display frames on a display image".

In the processing of step S119, the image arranging means 32 arranges the display frames 85a through 85d received in step S118 on the display image 80 or the display image 81.

On the other hand, the "cursor position information data" is not affected by the "one-frame data" transmitted from the computer devices 50a through 50d to the image display device 1, and is promptly transmitted as it is to the image display device 1.

As described above, in the seventh embodiment, the updating of the display frames 85a through 85d of the computer devices 50a through 50d having lower "priority levels" is slower, while the updating of the display frames 85a through 85d of the computer devices 50a through 50d having higher "priority levels" is quicker. Since the "cursor position information data" is promptly transmitted to the image display device 1, the movement of the cursors 82 displayed on the display image 80 or the display image 81 is caused by the operators of the computer devices 50a through 50d, and is smoothly displayed.

A projector is used as the image display device 1 in the above described embodiments. However, the image display device of the present invention is not limited to a projector. It is of course possible to apply the present invention to any image display device such as a Braun tube (or a cathode ray tube (CAT)), a liquid crystal display, an organic EL display, a plasma display, a rear-projection display, or a plasma address liquid crystal display.

Although the embodiments that are preferred and considered to be practical as of today have been described so far, the present invention is not limited to the embodiments disclosed in this specification. Rather, various changes and modifications may be made to the embodiments, without the scope and spirit of the invention defined in the claims and specification. It should be understood that image display devices having such changes and modifications made thereto fall in the technical scope of the invention.

The invention claimed is:

1. An image display device for displaying images, comprising:
 a receiver configured to receive a plurality of sets of image data corresponding to display frames of a plurality of computer devices and cursor position information data from the plurality of computer devices;
 a processor; and
 memory storing computer-readable instructions that, when executed by the processor, cause the processor to provide:
 an image arranging unit that places a plurality of images generated from the received plurality of image data corresponding to the display frames of the plurality of computer devices in one region in a non-overlapping manner or a synthetically overlapping manner;
 a cursor arranging unit that sets positions of a plurality of cursors in the one region, based on the received cursor position information data, and generates and places a plurality of cursor images in the one region;
 a bandwidth calculating unit that calculates and changes bandwidth of image data received from a computer device of the plurality of computer devices, based on at least one piece of information about the position and movement of at least one of the plurality of cursors in a display area of the one region corresponding to the computer device of the plurality of computer devices; and a transmission amount control unit that controls data transmission amounts of the plurality of computer devices, based on the bandwidth of image data.

2. The image display device according to claim 1, wherein the image arranging unit generates display frames corresponding to each of the plurality of computer devices, in accordance with the image data received from the plurality of computer devices, and arranges the display frames in the one region in a non-overlapping manner.

3. The image display device according to claim 2, wherein the bandwidth calculating unit increases the bandwidth of image data of a computer device transmitting the cursor position information data of the last moved cursor.

4. The image display device according to claim 2, wherein the bandwidth calculating unit increases the bandwidth of image data of a computer device transmitting the image data of the display frame having the last moved cursor located therein.

5. The image display device according to claim 2, wherein the bandwidth calculating unit increases the bandwidth of image data of a computer device transmitting the image data of the display frame having the cursor located therein.

6. The image display device according to claim 2, wherein the bandwidth calculating unit calculates a priority level from the number of cursors existing in the display frame of each of the plurality of computer devices, and determines the bandwidth based on the priority level.

7. The image display device according to claim 6, wherein the transmission amount control unit transmits a display frame update permitting signal to the plurality of computer devices in accordance with priority levels, the display frame update permitting signal allowing only one frame of the display frames displayed on the plurality of computer devices to be transmitted to the image display device.

8. The image display device according to claim 2, wherein
the bandwidth calculating unit calculates a priority level of each of the plurality of computer devices by adding a predetermined numeric value to the number of cursors existing in the display frame of each corresponding computer device, and
the bandwidth calculating unit calculates the image data bandwidth of each of the plurality of computer devices by dividing a maximum bandwidth used for image data transmission by a numeric value obtained by adding up all the priority levels, and multiplying the resultant value by the numeric value of each corresponding priority level.

9. The image display device according to claim 1, wherein the image arranging unit generates display frames corresponding to each of the plurality of computer devices, in accordance with the image data received from the plurality of computer devices, and arranges the display frames in one image region in a synthetically overlapping manner.

10. The image display device according to claim 9, wherein the bandwidth calculating unit increases the bandwidth of image data of a computer device transmitting the cursor position information data of the last moved cursor.

11. The image display device according to claim 9, wherein the bandwidth calculating unit increases the bandwidth of image data of a computer device transmitting the image data of a window region having the last moved cursor located therein.

12. The image display device according to claim 9, wherein the bandwidth calculating unit increases the bandwidth of image data of a computer device transmitting the image data of a window region having the cursor located therein.

13. The image display device according to claim 9, wherein the bandwidth calculating unit calculates a priority level from the number of cursors existing in a window region of each of the plurality of computer devices, and determines the bandwidth based on the priority level.

14. The image display device according to claim 13, wherein the transmission amount control unit transmits a display frame update permitting signal to the plurality of computer devices in accordance with priority levels, the display frame update permitting signal being a signal for allowing only one frame of the display frames displayed on the plurality of computer devices to be transmitted to the image display device.

15. The image display device according to claim 9, wherein
the bandwidth calculating unit calculates a priority level of each of the plurality of computer devices by adding a predetermined numeric value to the number of cursors existing in a window region displayed on each corresponding computer device, and
the bandwidth calculating unit calculates the image data bandwidth of each of the plurality of computer devices by dividing a maximum bandwidth used for image data transmission by a numeric value obtained by adding up all the priority levels, and multiplying the resultant value by the numeric value of each corresponding priority level.

16. The image display device according to claim 1, wherein the bandwidth calculating unit always maintains bandwidth of the cursor position information data transmitted from the plurality of computer devices at a predetermined bandwidth or greater, and subtracts the bandwidth of the cursor position information data from a maximum transmission bandwidth to determine a maximum image data bandwidth.

17. The image display device according to claim 16, wherein the transmission amount control unit transmits the bandwidth of the cursor position information data maintained by the bandwidth calculating unit to the plurality of computer devices, to control transmission amounts of the cursor position information data of the plurality of computer devices.

18. The image display device according to claim 1, wherein the transmission amount control unit transmits the bandwidth of image data calculated by the bandwidth calculating means to the plurality of computer devices, to control transmission amounts of the image data of the plurality of computer devices.

19. The image display device according to claim 1, wherein
in a case where the image data is transmitted by a communication process involving a flow control operation,
the transmission amount control unit transmits a reception confirmation signal or a next transmission request signal to the plurality of computer devices, when a per-unit-time reception data amount received by the receiver is not larger than the bandwidth of image data, and
the transmission amount control unit does not transmit the reception confirmation signal and the next transmission request signal to the plurality of computer devices, when the per-unit-time reception data amount received by the receiver is larger than the bandwidth of image data, image data transmission amounts of the plurality of computer devices being controlled by the transmission amount control unit.

* * * * *